United States Patent
Chen

(10) Patent No.: US 11,770,856 B2
(45) Date of Patent: Sep. 26, 2023

(54) RANDOM ACCESS RESPONSE METHOD AND DEVICE, BASE STATION AND USER EQUIPMENT

(71) Applicant: CHINA ACADEMY OF TELECOMMUNICATIONS TECHNOLOGY, Beijing (CN)

(72) Inventor: Li Chen, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 230 days.

(21) Appl. No.: 16/638,096

(22) PCT Filed: Jul. 25, 2018

(86) PCT No.: PCT/CN2018/097026
§ 371 (c)(1),
(2) Date: Feb. 10, 2020

(87) PCT Pub. No.: WO2019/029363
PCT Pub. Date: Feb. 14, 2019

(65) Prior Publication Data
US 2020/0178308 A1 Jun. 4, 2020

(30) Foreign Application Priority Data

Aug. 11, 2017 (CN) .......................... 201710687888.4

(51) Int. Cl.
*H04W 74/08* (2009.01)
*H04L 69/166* (2022.01)
(Continued)

(52) U.S. Cl.
CPC ....... *H04W 74/0833* (2013.01); *H04L 69/166* (2013.01); *H04L 69/22* (2013.01); *H04L 69/322* (2013.01); *H04W 28/065* (2013.01)

(58) Field of Classification Search
CPC . H04W 74/08; H04W 74/0833; H04W 28/06; H04W 28/065; H04L 69/16;
(Continued)

(56) References Cited

U.S. PATENT DOCUMENTS

| 7,979,769 | B2 * | 7/2011 | Chun | .................... | H04L 1/1877 |
| | | | | | 714/748 |
| 2002/0114301 | A1 * | 8/2002 | Yee | ...................... | H04B 7/2603 |
| | | | | | 370/349 |

(Continued)

FOREIGN PATENT DOCUMENTS

| CN | 102958073 A | 3/2013 |
| CN | 103249169 A | 8/2013 |

(Continued)

OTHER PUBLICATIONS

Notice of Reasons for Refusal from JP app. No. 2020-507615, dated Mar. 16, 2021, with English translation from Global Dossier.

(Continued)

*Primary Examiner* — Jenee Holland
(74) *Attorney, Agent, or Firm* — Ladas & Parry, LLP

(57) ABSTRACT

A random access response method, a random access response device, a base station and UE are provided. The method includes: transmitting a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

20 Claims, 7 Drawing Sheets

(51) Int. Cl.
  *H04L 69/22* (2022.01)
  *H04L 69/322* (2022.01)
  *H04W 28/06* (2009.01)
  *H04W 74/00* (2009.01)

(58) Field of Classification Search
  CPC ....... H04L 69/166; H04L 69/22; H04L 69/32; H04L 69/322
  See application file for complete search history.

(56) References Cited

U.S. PATENT DOCUMENTS

| | | | |
|---|---|---|---|
| 2009/0059858 A1* | 3/2009 | Lee | H04W 72/20 370/329 |
| 2009/0092076 A1* | 4/2009 | Zheng | H04W 28/06 370/328 |
| 2009/0156194 A1 | 6/2009 | Meylan | |
| 2009/0201798 A1* | 8/2009 | Lee | H04W 74/002 370/216 |
| 2010/0202288 A1* | 8/2010 | Park | H04W 74/0833 370/230 |
| 2010/0232363 A1* | 9/2010 | Hsu | H04L 1/0079 370/328 |
| 2010/0232364 A1* | 9/2010 | Hsu | H04W 74/085 370/328 |
| 2010/0260136 A1* | 10/2010 | Fan | H04W 72/0453 370/330 |
| 2011/0317777 A1* | 12/2011 | Huang | H04W 74/004 375/259 |
| 2012/0051297 A1* | 3/2012 | Lee | H04W 74/006 370/329 |
| 2012/0082088 A1* | 4/2012 | Dalsgaard | H04L 12/4625 370/315 |
| 2012/0275378 A1* | 11/2012 | Lee | H04W 74/085 370/328 |
| 2012/0300714 A1* | 11/2012 | Ng | H04W 56/0045 370/329 |
| 2012/0300715 A1* | 11/2012 | Pelletier | H04W 56/0005 370/329 |
| 2013/0021993 A1* | 1/2013 | Chou | H04W 74/08 370/329 |
| 2013/0034059 A1* | 2/2013 | Lee | H04W 74/006 370/328 |
| 2013/0039274 A1* | 2/2013 | Lee | H04W 74/0833 370/328 |
| 2013/0039308 A1* | 2/2013 | Lee | H04W 74/0833 370/329 |
| 2013/0040597 A1* | 2/2013 | Jang | H04W 4/90 455/410 |
| 2013/0077485 A1* | 3/2013 | Bai | H04W 74/006 370/230 |
| 2013/0114515 A1* | 5/2013 | Koo | H04J 11/0023 370/328 |
| 2013/0114516 A1* | 5/2013 | Koo | H04B 15/00 455/501 |
| 2013/0170479 A1* | 7/2013 | Fong | H04W 72/0446 370/336 |
| 2013/0272235 A1* | 10/2013 | Tseng | H04W 72/23 370/329 |
| 2014/0044074 A1* | 2/2014 | Chen | H04W 74/0833 370/329 |
| 2014/0050186 A1* | 2/2014 | Kim | H04L 5/0078 370/329 |
| 2014/0161110 A1* | 6/2014 | Kim | H04L 5/0028 370/336 |
| 2014/0341163 A1 | 11/2014 | Zhang et al. | |
| 2015/0215076 A1* | 7/2015 | Lee | H04L 1/1825 370/329 |
| 2015/0282214 A1* | 10/2015 | Lee | H04W 74/0833 370/329 |
| 2015/0312798 A1* | 10/2015 | Rune | H04L 1/0072 370/236 |
| 2016/0073292 A1* | 3/2016 | Fan | H04W 74/0833 370/230 |
| 2016/0100422 A1* | 4/2016 | Papasakellariou | H04L 1/1822 370/329 |
| 2016/0165378 A1* | 6/2016 | Harsha | H04W 74/008 370/329 |
| 2016/0212737 A1* | 7/2016 | Jang | H04L 5/001 |
| 2017/0094688 A1* | 3/2017 | Lee | H04W 4/70 |
| 2017/0135134 A1* | 5/2017 | Rune | H04W 74/0833 |
| 2019/0254114 A1* | 8/2019 | Son | H04W 76/27 |
| 2020/0178318 A1* | 6/2020 | Yu | H04W 76/11 |
| 2021/0392696 A1* | 12/2021 | Loehr | H04W 74/006 |

FOREIGN PATENT DOCUMENTS

| | | |
|---|---|---|
| CN | 103841654 A | 6/2014 |
| CN | 104010368 A | 8/2014 |
| CN | 104579541 A | 4/2015 |
| CN | 104579602 A | 4/2015 |
| CN | 109392178 A | 2/2019 |
| EP | 3621399 A1 | 3/2020 |
| JP | 2011509565 A | 3/2011 |
| KR | 20160048050 A | 5/2016 |
| WO | 2014175788 A1 | 10/2014 |

OTHER PUBLICATIONS

Notification of Reasons for Refusal from KR app. No. 10-2020-7006422, dated Apr. 8, 2021, with English translation from Global Dossier.
"Draft TS 38.321 v0.04", R1-1706608, 3GPP TSG-RAN WG2 NR Ad Hoc, Qingdao, China, Jun. 27-29, 2017.
"MAC PDU for RAR", R2-1707927, 3GPP TSG-RAN WG2 #99, Berlin, Germany, Aug. 21-25, 2017.
First Office Action and search report from CN app. No. 201710687888. 4, dated Jan. 2, 2020, with English translation from Global Dossier.
Second Office Action and supplementary search report from CN app. No. 201710687888.4, dated Jul. 14, 2020, with English translation from Global Dossier.
Extended European Search Report from EP app. No. 18844919.3, dated Jun. 29, 2020.
International Search Report from PCT/CN2018/097026, dated Oct. 24, 2018, with English translation from WIPO.
Written Opinion of the International Searching Authority from PCT/CN2018/097026, dated Oct. 24, 2018, with English translation from WIPO.
International Preliminary Report on Patentability from PCT/CN2018/097026, dated Feb. 11, 2020, with English translation from WIPO.
"MAC PDU Design", Tdoc R2-1704363, 3GPP TSG-RAN WG2 #98, Hangzhou, P.R. of China, May 15-19, 2017.
Small issues from email discussion [98#35] (running 38.321), R2-1706609. 3GPP TSG-RAN WG2 NR Ad Hoc, Qingdao, China, Jun. 27-29, 2017.
Summary of [98#34][NR] On-demand SI (Lenovo), R2-1707090, 3GPP TSG-RAN WG2 NR Ad Hoc, Qingdao, China, Jun. 27-29, 2017.
"Text proposal for MAC sub-header format", Tdoc R2-1707115, 3GPP TSG-RAN WG2 #98-AH, Qingdao, China, Jun. 27-29, 2017.
"Random Access in NR: RAR MAC PDU Design", R2-1704683, 3GPP TSG-RAN WG2 #99, Berlin, Germany, Aug. 21-25, 2017.
$3^{rd}$ Generation Partnership Project; Technical Specification Group Radio Access Network; Evolved Universal Terrestrial Radio Access (E-UTRA); Medium Access Control (MAC) protocol specification (Release 14), 3GPP TS 36.321 V14.3.0 (Jun. 2017).
"Text proposal for UL MAC PDU format", Tdoc R2-1707112, 3GPP TSG-RAN WG2 #98-AH, Qingdao, P.R. of China, Jun. 27-29, 2017.
Third Office Action from CN app. No. 201710687888.4, dated Nov. 26, 2020, with machine English translation.

* cited by examiner

RANDOM ACCESS RESPONSE METHOD AND DEVICE, BASE STATION AND USER EQUIPMENT

CROSS-REFERENCE TO RELATED APPLICATIONS

This application is a U.S. national phase application of PCT Application No. PCT/CN2018/097026 filed on Jul. 25, 2018, which claims priority to Chinese Patent Application No. 201710687888.4, filed on Aug. 11, 2017, the disclosures of which are incorporated herein by reference in their entireties.

TECHNICAL FIELD

The present disclosure relates to the field of communication technology, and in particular to a random access response (RAR) method, a random access response device, a base station and user equipment (UE).

BACKGROUND

Random access procedure in a Long Term Evolution (LTE) system and a New Radio (NR) system is divided into two types: contention-based random access and non-contention-based random access.

In an LTE system, the contention-based random access is used for: 1) initial access of UE; 2) a radio resource control (RRC) connection re-establishment and an RRC connection handover; 3) arrival of downlink data in an RRC connected state in an out-of-sync status; 4) arrival of uplink data in an RRC connected state; 5) positioning in an RRC connected state. A system message request, and UE connection recovery in inactive state are also introduced in the NR system. The contention-based random access procedure as shown in FIG. 1 is mainly divided into following four steps.

Msg1: UE selects a random access preamble and a random access resource PRACH (physical random access channel), and transmits the selected random access preamble to a base station on the selected PRACH resource. In an NR system, a specific preamble and/or PRACH resource is reserved for an Msg1 based system information (SI) request.

Msg2: after the base station receives a random access request Msg1, the base station transmits a random access response to the UE, and the random access response includes an uplink timing advance, an uplink (UL) grant allocated for an Msg3, and a temporary cell radio network temporary identifier (C-RNTI) assigned by a network side. The physical downlink control channel (PDCCH) carrying an Msg2 scheduling message is scrambled with a random access-radio network temporary identifier (RA-RNTI), a preamble ID is also carried in the Msg2, and the UE determines according to the RA-RNTI and the preamble ID that the Msg2 corresponds to the Msg1 transmitted by the UE. In an NR system, for an Msg1 based SI request, the Msg2 only includes preamble ID information corresponding to the Msg1, and includes no other content. Moreover, for an Msg1 based SI request scenario, the random access procedure ends at the Msg2. That is, in case that the received Msg2 includes a preamble ID corresponding to the preamble transmitted by the Msg1, an Msg1 based SI request procedure is considered complete.

Msg3: the UE transmits uplink transmission on a UL grant designated by the Msg2, and content of the uplink transmission of the Msg3 is different for different causes of random access. For example, for the initial access, the Msg3 transmits an RRC connection establishment request.

Msg4: a contention resolution message, the UE may determine whether the random access is successful according to the Msg4. For an initial access of UE, the temporary C-RNTI is automatically converted into a unique UE identifier C-RNTI of the UE in the cell after the contention is successfully resolved.

The non-contention-based random access is used for the handover, the arrival of the downlink data, the positioning, and obtaining uplink timing. The procedure shown in FIG. 2 is mainly divided into following three steps.

Msg0: a base station assigns to UE a dedicated preamble for non-contention-based random access and a PRACH resource used for random access.

Msg1: the UE transmits the designated dedicated preamble to the base station on the designated PRACH resource as directed by the Msg0. After receiving the Msg1, the base station calculates an uplink timing advance TA according to the Msg1.

Msg2: the base station transmits a random access response to the UE, the random access response includes timing advance information and subsequent UL grant, and the timing advance is used for determining a timing relationship of subsequent uplink transmission of the UE.

In the LTE system, the media access control protocol data unit (MAC PDU) of the random access response message includes an MAC header and possibly several media access control random access responses (MAC RARs). The MAC header consists of one or more MAC subheaders. There is at most one subheader including a back off indicator (BI) in each MAC PDU and this subheader does not correspond to an MAC RAR, while each of other MAC subheaders corresponds to one MAC RAR.

There are two types of MAC subheaders in the LTE system. One type is to carry a BI and the other type is to carry a random access preamble ID (RAPID). The subheader carrying the preamble ID always corresponds to one MAC RAR. The specific format is as shown in FIG. 3 to FIG. 6.

A format of a random access response MAC PDU for the NR system has not been defined. One approach is to follow the LTE format. In the LTE system, the UE must parse each MAC subheader in the MAC header in sequence, and can not receive the MAC RAR until all the subheaders are parsed. In case that the MAC RAR for the UE is received relatively late, the UE needs to discard other MAC RARs in sequence until the MAC RAR for the UE is parsed. This approach will result in problems such as low processing efficiency, long latency between Msg2 and Msg3, and increased power consumption of UE.

SUMMARY

A purpose of the present disclosure is to provide a random access response method, a random access response device, a base station, and UE, to solve the problems of random access response message parsing process in the related art, such as low processing efficiency, a long latency between the Msg2 and the Msg3, and increased power consumption of the UE.

In a first aspect, some embodiments of the present disclosure provide a random access response method, which is applied to a base station and includes: transmitting a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

The MAC subPDU includes a type 1 MAC subPDU, the type 1 MAC subPDU includes only a first MAC subheader.

The first MAC subheader is a subheader including a back off indicator (BI).

In the random access response message, the type 1 MAC subPDU is arranged before other MAC subPDUs.

The first MAC subheader is an MAC subheader for responding to an Msg1 based system information request.

The type 1 MAC subPDU is located at a predetermined position of the MAC PDU of the random access response message.

The predetermined position is a position before all type 2 MAC subPDUs, or a position after all the type 2 MAC subPDUs, where the type 2 MAC subPDU includes an MAC subheader and a corresponding MAC RAR.

In a second aspect, some embodiments of the present disclosure further provide a random access response method, which is applied to UE and includes: receiving a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

The MAC subPDU includes a type 1 MAC subPDU, the type 1 MAC subPDU includes only a first MAC subheader.

The first MAC subheader is a subheader including a back off indicator (BI).

In the random access response message, the type 1 MAC subPDU is arranged before other MAC subPDUs.

The first MAC subheader is an MAC subheader for responding to an Msg1 based system information request.

The type 1 MAC subPDU is located at a predetermined position of the MAC PDU of the random access response message.

The predetermined position is a position before all type 2 MAC subPDUs, or a position after all the type 2 MAC subPDUs, where the type 2 MAC subPDU includes an MAC subheader and a corresponding MAC RAR.

After receiving the random access response message transmitted by the base station, the method further includes: parsing the random access response message.

Parsing the random access response message includes: parsing a first MAC subPDU of the random access response message; splitting, in case that an MAC subheader of the first MAC subPDU includes a random access preamble ID (RAPID) and therefore the first MAC subPDU is an MAC subPDU including an MAC RAR, the entire MAC PDU according to a preset byte length of an MAC subPDU including an MAC RAR to obtain each MAC subPDU including an MAC RAR; parsing all the MAC subPDUs in parallel.

After the parsing the first MAC subPDU of the random access response message, the method further includes: splitting, in case that the first MAC subPDU is an MAC subheader including a back off indicator (BI) and an Msg1 based system information request function is not enabled for a cell where the UE initiates random access, a remainder of the entire MAC PDU excluding the first MAC subPDU according to the preset byte length of the MAC subPDU including an MAC RAR, to obtain each MAC subPDU including an MAC RAR; parsing all the MAC subPDUs in parallel.

After the parsing the first MAC subPDU of the random access response message, the method further includes: further parsing a second MAC subPDU of the random access response message in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located before all type 2 MAC subPDUs; further parsing a third MAC subPDU of the random access response message in case that it is determined that the second MAC subPDU includes an MAC subheader for responding to the Msg1 based system information request; splitting, in case that the third MAC subPDU includes an MAC RAR, a remainder of the entire MAC PDU excluding the first MAC subPDU and the second MAC subPDU according to the preset byte length of the MAC subPDU including an MAC RAR, to obtain each MAC subPDU including an MAC RAR; parsing all the MAC subPDUs in parallel.

After the parsing all the MAC subPDUs in parallel, the method further includes: discarding, when the RAPID included in the MAC subheader of one of the parsed MAC subPDUs is consistent with a random access preamble ID used by the UE to transmit a random access request Msg1, other MAC subPDUs including an MAC RAR.

After the parsing the first MAC subPDU of the random access response message, the method further includes: splitting, in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located after all type 2 MAC subPDUs, a remainder of the entire MAC PDU excluding the first MAC subPDU according to the preset byte length of the MAC subPDU including an MAC RAR, to obtain each MAC subPDU including an MAC RAR, or to obtain each MAC subPDU including an MAC RAR and a remaining part of a size less than the byte length of the MAC subPDU including an MAC RAR, where the remaining part includes or does not include the MAC subPDU for responding to the Msg1 based system information request.

After the obtaining each MAC subPDU including an MAC RAR, the method further includes: separately parsing all the MAC subPDUs including an MAC RAR in parallel and parsing the MAC subPDU for responding to the Msg1 based system information request if the MAC subPDU for responding to the Msg1 based system information request is included.

The method further including: discarding, by the UE, in case that the UE transmits the Msg1 based system information request and another random access request simultaneously, and in case that the RAPID included in the MAC subheader of one of the parsed MAC subPDUs including an MAC RAR is consistent with a random access preamble ID used by the UE to transmit a random access request Msg1, other MAC subPDUs including an MAC RAR; discarding, by the UE, in case that the UE transmits only the Msg1 based system information request, all MAC subPDUs including an MAC RAR, and parsing only the remaining part to obtain a response to the Msg1 based system information request;

discarding, by the UE, in case that the UE only transmits a random access request other than the Msg1 based system information request, the remaining part including or not including the MAC subPDU for responding to the Msg1 based system information request, and parsing MAC subP-DUs including an MAC RAR in parallel, and discarding, in case that the RAPID included in the MAC subheader of one of the parsed MAC subPDUs is consistent with a random access preamble ID used by the UE to transmit a random access request Msg1, all other MAC subPDUs.

In a third aspect, some embodiments of the present disclosure further provide a random access response device, which is applied to a base station and includes: a transmission module configured to transmit a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

The MAC subPDU includes a type 1 MAC subPDU, the type 1 MAC subPDU includes only a first MAC subheader.

The first MAC subheader is a subheader including a back off indicator (BI).

In the random access response message, the type 1 MAC subPDU is arranged before other MAC subPDUs.

The first MAC subheader is an MAC subheader for responding to an Msg1 based system information request.

The type 1 MAC subPDU is located at a predetermined position of the MAC PDU of the random access response message.

The predetermined position is a position before all type 2 MAC subPDUs, or a position after all the type 2 MAC subPDUs, where the type 2 MAC subPDU includes an MAC subheader and a corresponding MAC RAR.

In a fourth aspect, some embodiments of the present disclosure further provide a base station including a storage, a processor, and a computer program stored on the storage and executable on the processor, and the processor executes the computer program to implement the following steps: transmitting a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In a fifth aspect, some embodiments of the present disclosure further provide a computer readable storage medium, a computer program is stored therein, where the computer program is configured to be executed by a processor to implement the following steps: transmitting a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In a sixth aspect, some embodiments of the present disclosure further provide a random access response device, which is applied to UE and includes: a reception module configured to receive a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

The MAC subPDU includes a type 1 MAC subPDU, the type 1 MAC subPDU includes only a first MAC subheader.

The first MAC subheader is a subheader including a back off indicator (BI).

In the random access response message, the type 1 MAC subPDU is arranged before other MAC subPDUs.

The first MAC subheader is an MAC subheader for responding to an Msg1 based system information request.

The type 1 MAC subPDU is located at a predetermined position of the MAC PDU of the random access response message.

The predetermined position is a position before all type 2 MAC subPDUs, or a position after all the type 2 MAC subPDUs, where the type 2 MAC subPDU includes an MAC subheader and a corresponding MAC RAR.

The device further includes: a parsing module, configured to parse the random access response message after the random access response message transmitted by the base station is received.

The parsing module includes: a first parsing submodule configured to parse a first MAC subPDU of the random access response message; a first splitting submodule configured to split, in case that an MAC subheader of the first MAC subPDU includes a random access preamble ID (RAPID) and therefore the first MAC subPDU is an MAC subPDU including an MAC RAR, the entire MAC PDU according to a preset byte length of an MAC subPDU including an MAC RAR to obtain each MAC subPDU including an MAC RAR; a first parallel parsing submodule, configured to parse all the MAC subPDUs in parallel.

The parsing module further includes: a second splitting submodule, configured to, after the first MAC subPDU of the random access response message is parsed, split, in case that the first MAC subPDU is an MAC subheader including a back off indicator (BI) and an Msg1 based system information request function is not enabled for a cell where the UE initiates random access, a remainder of the entire MAC PDU excluding the first MAC subPDU according to the preset byte length of the MAC subPDU including an MAC RAR, to obtain each MAC subPDU including an MAC RAR; a second parallel parsing submodule, configured to parse all the MAC subPDUs in parallel.

The parsing module further includes: a second parsing submodule, configured to, after the first MAC subPDU of the random access response message is parsed, further parse a second MAC subPDU of the random access response message in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located before all type 2 MAC subPDUs; a third parsing submodule, configured to further parse a third MAC subPDU of the random access response message in case that it is determined that the second MAC subPDU includes an MAC subheader for responding to the Msg1 based system information request; a third splitting submodule, configured to split, in case that the third MAC subPDU includes an MAC RAR, a remainder of the entire MAC PDU excluding the first MAC subPDU and the second MAC subPDU according to the preset byte length of the MAC subPDU including an MAC RAR, to obtain each MAC subPDU including an MAC RAR; a third parallel parsing submodule, configured to parse all the MAC subPDUs in parallel.

The parsing module further includes: a first processing submodule, configured to, after all the MAC subPDUs are parsed in parallel, discard, when the RAPID included in the MAC subheader of one of the parsed MAC subPDUs is consistent with a random access preamble ID used by the UE to transmit a random access request Msg1, other MAC subPDUs including an MAC RAR.

The parsing module further includes: a fourth splitting submodule, configured to, after the first MAC subPDU of the random access response message is parsed, split, in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located after all type 2 MAC subPDUs, a remainder of the entire MAC PDU excluding the first MAC subPDU according to the preset byte length of the MAC subPDU including an MAC RAR, to obtain each MAC subPDU including an MAC RAR and possibly a remaining part of a size less than the byte length of the MAC subPDU including an MAC RAR, where the remaining part includes or does not include the MAC subPDU for responding to the Msg1 based system information request.

The parsing module further includes: a fourth parsing submodule, configured to separately parse all the MAC subPDUs including an MAC RAR in parallel and parse the MAC subPDU for responding to the Msg1 based system information request if the MAC subPDU for responding to the Msg1 based system information request is included.

The parsing module further includes: a second processing submodule, configured to discard, in case that the UE transmits the Msg1 based system information request and another random access request simultaneously, and in case that the RAPID included in the MAC subheader of one of the parsed MAC subPDUs including an MAC RAR is consistent with a random access preamble ID used by the UE to transmit a random access request Msg1, other MAC subPDUs including an MAC RAR; a third processing submodule, configured to discard, by the UE, in case that the UE transmits only the Msg1 based system information request, all MAC subPDUs including an MAC RAR, and parse only the remaining part to obtain a response to the Msg1 based system information request; a fourth processing submodule, configured to discard, by the UE, in case that the UE only transmits a random access request other than the Msg1 based system information request, the remaining part including or not including the MAC subPDU for responding to the Msg1 based system information request, and parse MAC subPDUs including an MAC RAR in parallel, and discard, in case that the RAPID included in the MAC subheader of one of the parsed MAC subPDUs is consistent with a random access preamble ID used by the UE to transmit a random access request Msg1, all other MAC subPDUs.

In a seventh aspect, some embodiments of the present disclosure further provide UE including a storage, a processor, and a computer program stored on the storage and executable on the processor, and the processor executes the computer program to implement the following steps: receiving a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In an eighth aspect, some embodiments of the present disclosure further provide a computer readable storage medium, a computer program is stored therein, where the computer program is configured to be executed by a processor to implement the following steps: receiving a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In general, there may be three categories of MAC subPDUs in the present disclosure. The first category is an MAC subPDU which includes only an MAC subheader including a BI, that is, a first category of the type 1 MAC subPDU. The second category is an MAC subPDU which includes only an MAC subheader including an RAPID, that is, a second category of the type 1 MAC subPDU, and the RAPID is consistent with a preamble ID reserved for an Msg1 based SI request. The third category is an MAC subPDU including an MAC subheader and an MAC RAR simultaneously, that is, a type 2 MAC subPDU. The contents of MAC subPDUs are completely independent of each other.

In the above-mentioned sequence of steps of the present disclosure, if the parsing of a previous step is unsuccessful, the processing jumps directly to the next step in the sequence until the end of the parsing process is reached.

Some embodiments of the present disclosure have the following beneficial effects. According to the foregoing technical solution of some embodiments of the present disclosure, a base station transmits a random access response message to UE, and the UE receives the random access response message transmitted by the base station and parses the random access response message, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU. For a base station gNB, the base station may respond to random access requests originating from a plurality of UE and a variety of demands in a single MAC PDU, thereby not only achieving rapid feedback of random access responses, but also effectively saving time-frequency resources. For the UE, by utilizing independent MAC subPDU design which is unique of the present disclosure, a single UE may quickly split the MAC PDU and parse the MAC subPDUs in parallel, thereby quickly obtaining a response to the random access request of the present UE and discarding redundant information, which not only reduces random access latency, but also realizes the power saving of the UE.

DETAILED DESCRIPTION

The technical solutions of the present disclosure will be clearly and completely described below with reference to the drawings of the present disclosure, apparently, the described embodiments are merely some embodiments of the present disclosure, rather than all embodiments. Based on the embodiments of the present disclosure, all other embodiments derived by a person of ordinary skill in the art without any creative efforts shall fall within the scope of the present disclosure.

Some embodiments of the present disclosure provide a random access response method, a random access response device, a base station, and UE, to solve the problems of random access response message parsing process in the related art, such as low processing efficiency, a long latency between the Msg2 and the Msg3, and increased power consumption of the UE.

Figure 1:
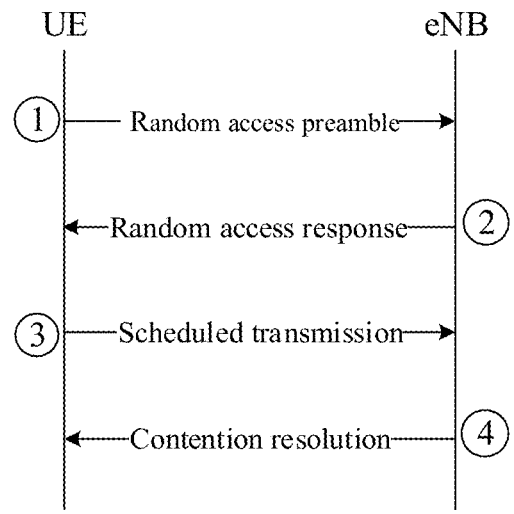
FIG. 1 is a flowchart illustrating contention-based random access of an LTE system and a NR system.
Figure 2:
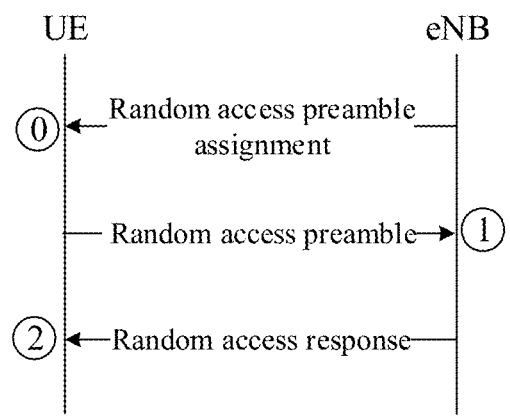
FIG. 2 is a flowchart illustrating non-contention-based random access of an LTE system and a NR system.
Figure 3:
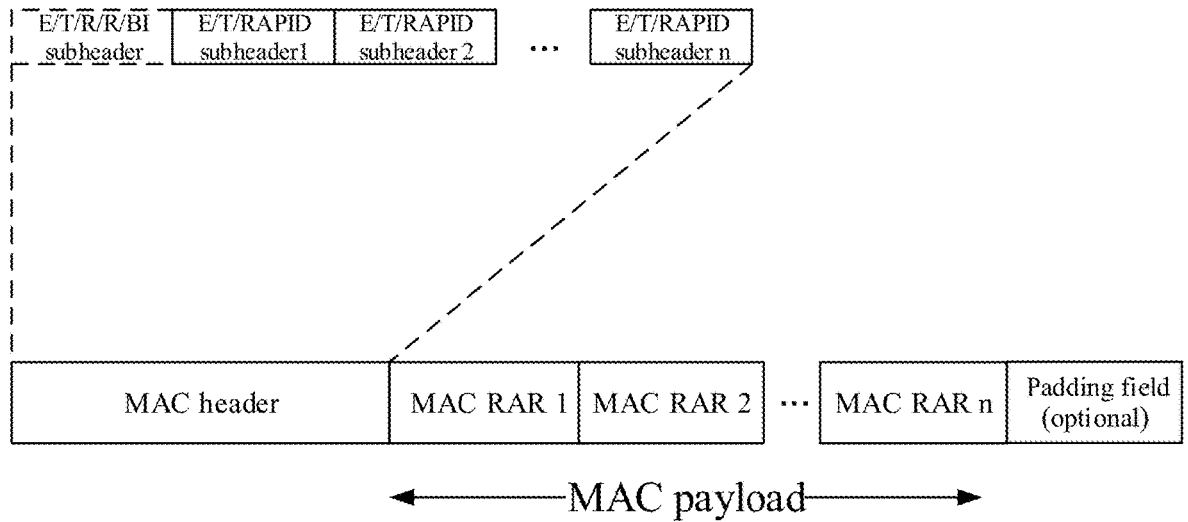
FIG. 3 is a schematic structural diagram illustrating an MAC PDU of a random access response message of an LTE system.
Figure 4:
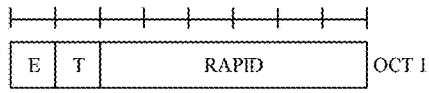
FIG. 4 is a schematic structural diagram illustrating an MAC subheader in FIG. 3 which carries an RAPID.
Figure 5:
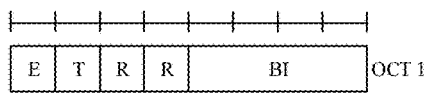
FIG. 5 is a schematic structural diagram illustrating an MAC subheader in FIG. 3 which carries a BI.
Figure 6:
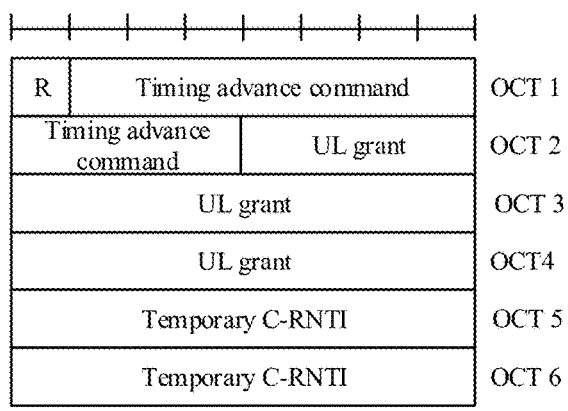
FIG. 6 is a schematic structural diagram illustrating the MAC RAR in FIG. 3.
Figure 7:
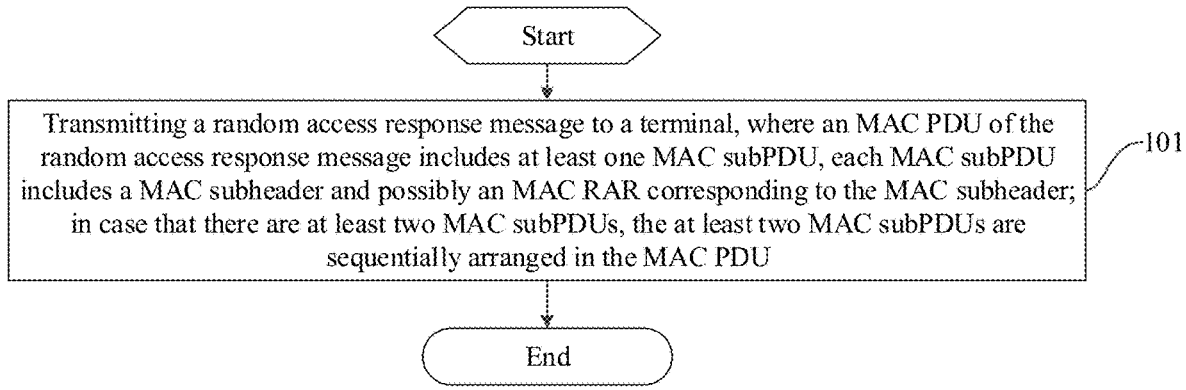
FIG. 7 is a first workflow chart illustrating a random access response method according to some embodiments of the present disclosure.

As shown in FIG. 7, some embodiments of the present disclosure provide a random access response method. The method is applied to a base station and includes step 101.

The step 101 includes: transmitting a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

Figure 8:
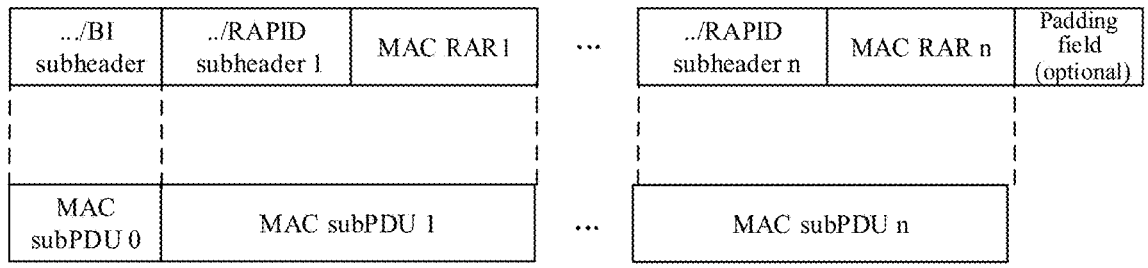
FIG. 8 is a schematic structural diagram illustrating an MAC PDU of a random access response message according to the present disclosure.

Here, the present disclosure defines an MAC PDU structure, as shown in FIG. 8.

Specifically, each MAC subheader and its corresponding MAC RAR in the MAC PDU form an MAC sub-protocol data unit, i.e., an MAC subPDU. In case that there is no corresponding MAC RAR, the MAC subheader alone forms an MAC subPDU. All MAC subPDUs are arranged in sequence.

According to the random access response method of some embodiments of the present disclosure, a base station transmits a random access response message to the UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU, so as to enable the base station gNB to quickly respond to random access requests originating from a plurality of UE and a variety of demands.

Optionally, the MAC subPDU includes a type 1 MAC subPDU, the type 1 MAC subPDU includes only a first MAC subheader.

Specifically, the first MAC subheader is a subheader including a back off indicator (BI).

Further, in the random access response message, the type 1 MAC subPDU is arranged before other MAC subPDUs.

Here, the type 1 MAC subPDU includes the subhead of the BI, and the type 1 MAC subPDU is the first in the MAC PDU.

Optionally, the first MAC subheader is an MAC subheader for responding to an Msg1 based system information request.

It should be noted that, in the NR system, in addition to the MAC subheader including the BI and the subheader corresponding to the MAC RAR, there is also a MAC subheader directed to the response to the Msg1 based SI request. The format of the MAC subheader for the response is the same as the format of the MAC subheader corresponding to the MAC RAR, except that there is no corresponding MAC RAR in the MAC subheader.

In other words, the MAC subheader for responding to the Msg1 based SI request independently forms an MAC subPDU that includes only the MAC subheader.

Here, the type 1 MAC subPDU is located at a predetermined position of the MAC PDU of the random access response message.

Specifically, the predetermined position is a position before all type 2 MAC subPDUs, or a position after all the type 2 MAC subPDUs, where the type 2 MAC subPDU includes an MAC subheader and a corresponding MAC RAR.

Figure 9:
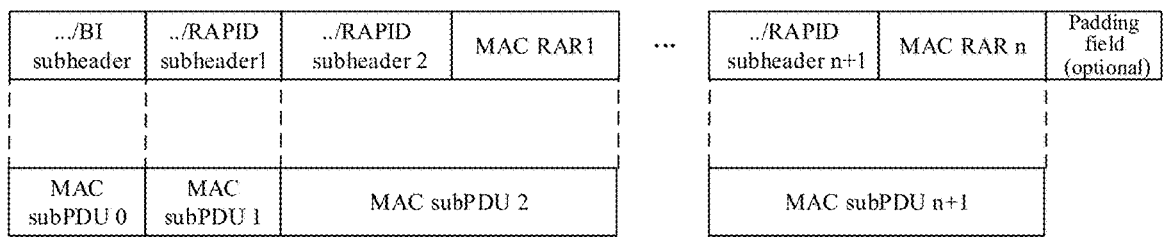
FIG. 9 is a first schematic diagram illustrating a location of an MAC subPDU for responding to an Msg1 based SI request in an MAC PDU according to the present disclosure.

As shown in FIG. 9, a first schematic diagram illustrating a location of an MAC subPDU for responding to an Msg1 based SI request in an MAC PDU is illustrated.

It should be noted that, the first MAC subPDU in the MAC PDU is an MAC subheader including a BI; in case that there is no BI indication, the MAC subPDU may not exist; the second MAC subPDU is an MAC subPDU for responding to the Msg1 based SI request; each subsequent MAC subPDU is a random access response to the UE transmitting the corresponding preamble, that is, each subsequent MAC subPDU includes an MAC subheader and a corresponding MAC RAR.

Figure 10:
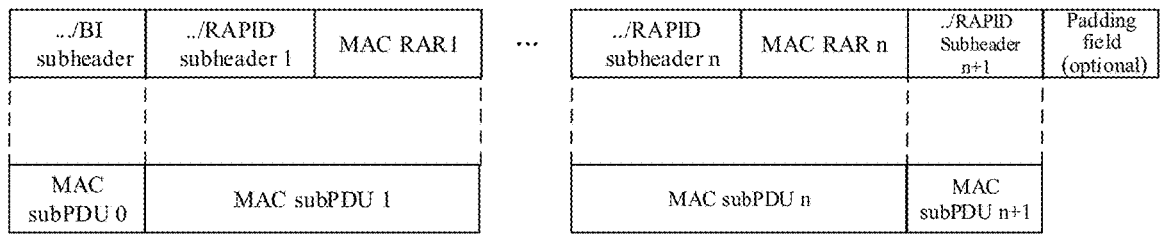
FIG. 10 is a second schematic diagram illustrating a location of an MAC subPDU for responding to an Msg1 based SI request in an MAC PDU according to the present disclosure.

As shown in FIG. 10, a second schematic diagram illustrating a location of an MAC subPDU for responding to an Msg1 based SI request in an MAC PDU is illustrated.

It should be noted that, the first MAC subPDU in the MAC PDU is an MAC subheader including a BI, in case that there is no BI indication, the MAC subPDU may not exist; the following MAC subPDUs are MAC subPDUs including an MAC RAR, where each MAC subPDU is a random access response to the UE transmitting the corresponding preamble; the MAC subPDUs including an MAC RAR is followed by an MAC subPDU for responding to the Msg1 based SI request.

That is, the MAC subPDU for responding to the Msg1 based SI request is arranged after all the MAC subPDUs including an MAC RAR.

According to the random access response method of some embodiments of the present disclosure, a base station transmits a random access response message to UE, the UE receives the random access response message transmitted by the base station and parses the random access response message, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU, so that not only the base station gNB may quickly respond to random access requests originating from a plurality of UE and a variety of demands, but also single UE quickly receives and parses a response to a random access request transmitted by the UE, which reduces random access latency, and realizes the power saving of the UE.

Figure 11:
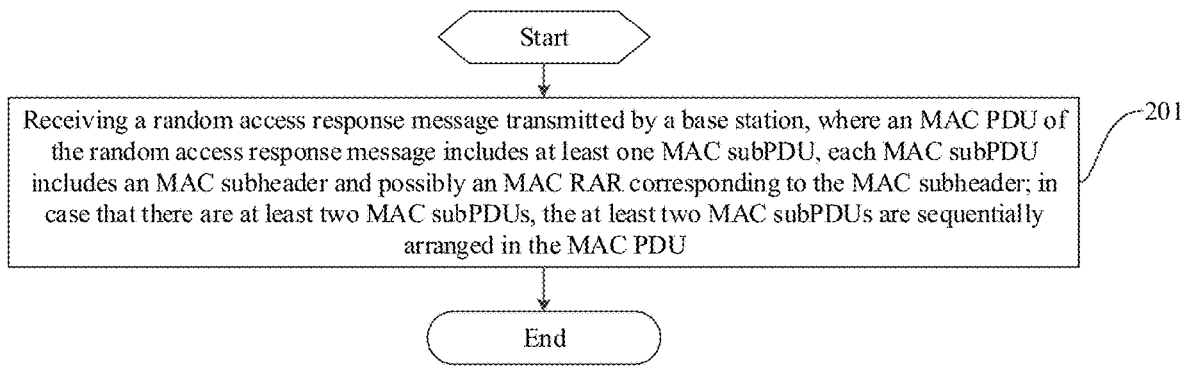
FIG. 11 is a second workflow chart illustrating a random access response method according to some embodiments of the present disclosure.

As shown in FIG. 11, some embodiments of the present disclosure further provide a random access response method. The method is applied to UE and includes step 201.

The step 201 includes: receiving a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

Here, the present disclosure defines an MAC PDU structure, as shown in FIG. 8. For a specific structure thereof, refer to the description of the embodiment of the random access response method at the base station side, which will not be repeated herein.

According to the random access response method of some embodiments of the present disclosure, the UE receives the random access response message transmitted by the base station and parses the random access response message, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU, so that single UE may quickly receive and parse a response to a random access request transmitted by the UE, which reduces random access latency, and realizes the power saving of the UE.

Optionally, the MAC subPDU includes a type 1 MAC subPDU, the type 1 MAC subPDU includes only a first MAC subheader.

Specifically, the first MAC subheader is a subheader including a back off indicator (BI).

Further, in the random access response message, the type 1 MAC subPDU is arranged before other MAC subPDUs.

Here, the type 1 MAC subPDU includes the subhead of the BI, and the type 1 MAC subPDU is the first in the MAC PDU.

Optionally, the first MAC subheader is an MAC subheader for responding to an Msg1 based system information request.

It should be noted that, in the NR system, in addition to the MAC subheader including the BI and the subheader corresponding to the MAC RAR, there is also an MAC subheader directed to the response to the Msg1 based SI request. The format of the MAC subheader of the response is the same as the format of the MAC subheader corresponding to the MAC RAR, except that there is no corresponding MAC RAR in the MAC subheader.

In other words, the MAC subheader for responding to the Msg1 based SI request independently form an MAC subPDU which includes only the MAC subheader.

Here, the type 1 MAC subPDU is located at a predetermined position of the MAC PDU of the random access response message.

Specifically, the predetermined position is a position before all type 2 MAC subPDUs, or a position after all the type 2 MAC subPDUs, where the type 2 MAC subPDU includes an MAC subheader and a corresponding MAC RAR.

For the specific position of the MAC subPDU for responding to the Msg1 based SI request in the MAC PDU, refer to FIG. 9 and FIG. 10 specifically; and for the detailed description of the MAC PDU structure including the MAC subPDU for responding to the Msg1 based SI request, refer to the relevant description of the embodiment of the random access response method at the base station side, which will not be repeated herein.

Further, in the present disclosure, after the step 201, the method further includes step 202.

The step 202 includes: parsing the random access response message.

According to the random access response method of some embodiments of the present disclosure, the UE receives the random access response message transmitted by the base station and parses the random access response message, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU. In this way, the UE does not need to parse each MAC subheader and corresponding MAC RAR serially, so that the UE may quickly receive and parse a response to a random access request transmitted by the UE, which reduces random access latency, and realizes the power saving of the UE.

As an optional implementation, the foregoing step 202 includes substeps 202-1 to 202-3.

The substep 202-1 includes: parsing a first MAC subPDU of the random access response message.

The substep 202-2 includes: splitting, in case that an MAC subheader of the first MAC subPDU includes a random access preamble ID (RAPID) and therefore the first MAC subPDU is an MAC subPDU including an MAC RAR, the entire MAC PDU according to a preset byte length of an MAC subPDU including an MAC RAR to obtain each MAC subPDU including an MAC RAR.

The substep 202-3 includes: parsing all the MAC subPDUs in parallel.

Figure 12:
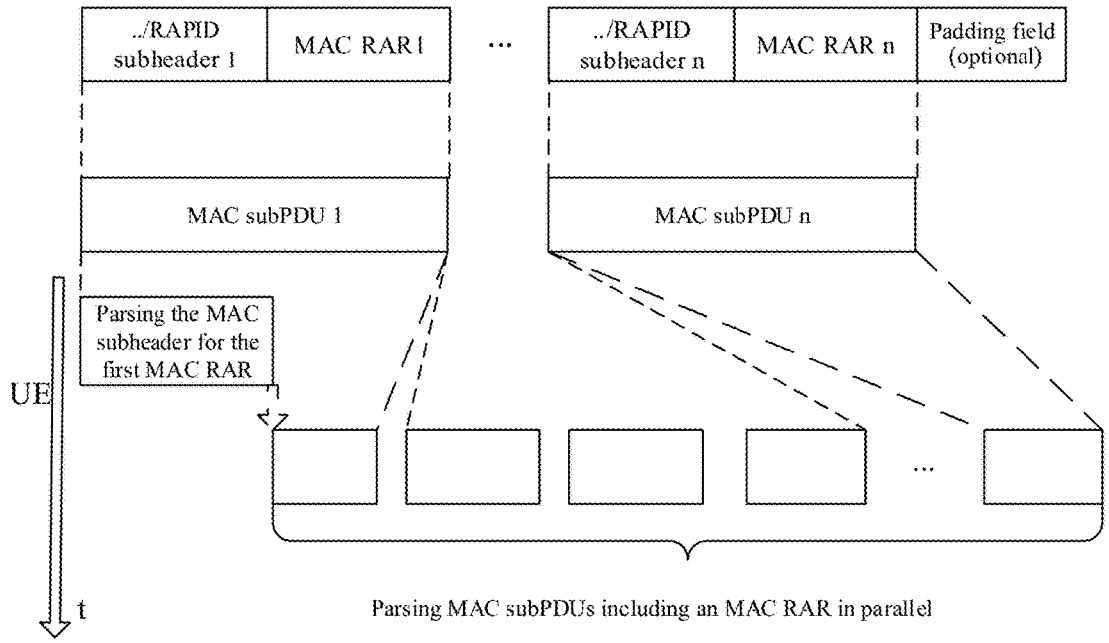
FIG. 12 is a schematic structural diagram illustrating an MAC PDU, which includes an MAC subPDU including only an MAC RAR, of a random access response message according to the present disclosure.

It should be noted that, the random access response MAC PDU corresponding to the above steps 202-1 to 202-3 includes only an MAC subPDU including an MAC RAR, which is the simplest MAC PDU structure. The MAC PDU structure and a parsing process performed by UE are as shown in FIG. 12.

Based on the MAC PDU structure, in order to more clearly explain the processing procedure of random access, the following description is given based on both the base station side and the UE side.

1) The Base Station Side

In Step 1, a base station receives a random access request Msg1 transmitted by UE on the same time-frequency resource, and different UE may transmit different preamble codes on the same time-frequency resource.

In Step 2, the base station organizes a random access response Msg2 for UE transmitting the Msg1 on the same time-frequency resource. For UE transmitting different preamble codes on the same time-frequency resource, a plurality of random access responses, that is, MAC RARs, may be organized in one MAC PDU.

Here, MAC RARs are organized according to the MAC PDU format defined in some embodiments of the present disclosure.

In Step 3, the base station receives an Msg3 according to the uplink resource allocated by the Msg2 and performs subsequent operations of random access.

2) The UE side

In Step 1, UE selects a PRACH and a preamble to initiate random access according to random access resources configured by a base station.

In Step 2, the UE parses an MAC subheader of a first MAC subPDU and determines that it includes an MAC RAR.

In Step 3, the UE splits the MAC PDU into an integer number of MAC subPDUs, each MAC subPDU includes an MAC subheader and an MAC RAR, and parses the MAC subPDUs in parallel, and once the MAC subPDU for the UE is acquired, that is, an RAPID included in the MAC subheader of one of the parsed MAC subPDUs is consistent with the random access preamble ID of the Msg1 transmitted by the UE, other MAC subPDUs are discarded.

In Step 4, the UE transmits an Msg3 and performs subsequent operations according to the received MAC RAR.

Further, in some embodiments of the present disclosure, after the substep 202-3, a substep 202-4 is further included.

The substep 202-4 includes: discarding, when the RAPID included in the MAC subheader of one of the parsed MAC subPDUs is consistent with a random access preamble ID used by the UE to transmit a random access request Msg1, other MAC subPDUs including an MAC RAR.

Here, due to the structure characteristics of the MAC PDUs of some embodiments of the present disclosure, the MAC subPDUs constituting the MAC RAR are independent of each other, and a parallel parsing method can be used to quickly parse and determine the MAC subPDU including an MAC RAR that matches the random access preamble ID currently used by the UE to transmit the random access request Msg1, which not only reduces the random access latency, but also achieves the power saving of the UE.

As another optional implementation, after the step 202-1, substeps 202-5 and 202-6 are further included.

The substep 202-5 includes: splitting, in case that the first MAC subPDU is an MAC subheader including a back off indicator (BI) and an Msg1 based system information request function is not enabled for a cell where the UE initiates random access, a remainder of the entire MAC PDU excluding the first MAC subPDU according to the preset byte length of the MAC subPDU including an MAC RAR, to obtain each MAC subPDU including an MAC RAR.

The substep 202-6 includes: parsing all the MAC subPDUs in parallel.

Figure 13:
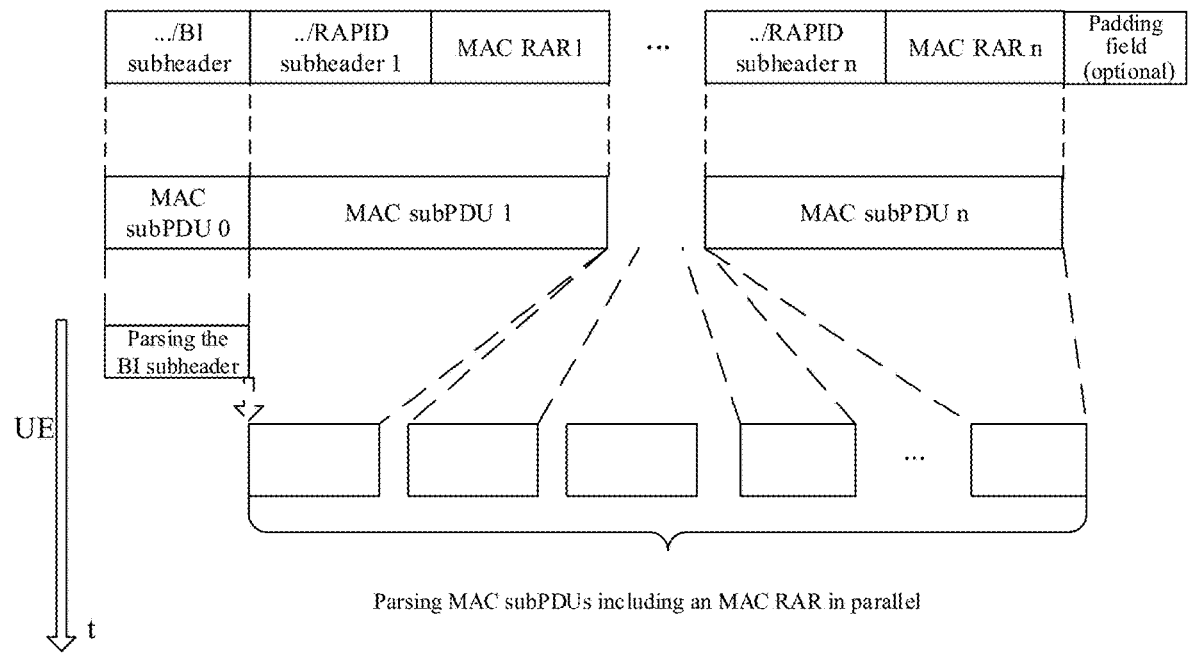
FIG. 13 is a schematic structural diagram illustrating an MAC PDU, which includes an MAC subPDU including a BI and an MAC subPDU including an MAC RAR, of a random access response message according to the present disclosure.

It should be noted that, the random access response MAC PDU corresponding to the steps 202-5 to 202-6 includes an MAC subPDU including a BI and an MAC subPDU including an MAC RAR. The MAC PDU structure and a parsing process performed by UE are as shown in FIG. 13.

Based on the MAC PDU structure, in order to more clearly explain the processing process of random access, the following description is given based on both the base station side and the UE side.

1) The Base Station Side

In Step 1, a base station receives a random access request Msg1 transmitted by UE on the same time-frequency resource, and different UE may transmit different preamble codes on the same time-frequency resource.

In Step 2, the base station organizes a random access response Msg2 for UE transmitting the Msg1 on the same time-frequency resource. For UE transmitting different preamble codes on the same time-frequency resource, a plurality of random access responses, that is, MAC RARs, can be organized in one MAC PDU, and at the same time, the base station may transmit a BI to perform a random access congestion control.

In Step 3, the base station receives an Msg3 according to the uplink resource allocated by the Msg2 and performs subsequent operations of random access.

2) The UE Side

In Step 1, UE selects a PRACH and a preamble to initiate random access according to random access resources configured by a base station.

In Step 2, the UE parses an MAC subheader of the first MAC subPDU and determines that it includes a BI.

In Step 3, the UE splits the remainder of the MAC PDU excluding the first MAC subPDU into an integer number of MAC subPDUs, each MAC subPDU includes an MAC subheader and an MAC RAR, and parses the MAC subPDUs in parallel, and in case that the MAC subPDU for the UE is acquired, that is, an RAPID included in the MAC subheader of one of the parsed MAC subPDUs is consistent with the random access preamble ID of the Msg1 transmitted by the UE, other MAC subPDUs are discarded.

In Step 4, the UE transmits an Msg3 and performs subsequent operations according to the received MAC RAR.

Further, after the substep 202-6, the step 202-4 is performed. For details, refer to the description of step 202-4, which is not described herein again.

As yet another optional implementation, after the substep 202-1, the method further includes following steps.

A substep 202-7 includes: further parsing a second MAC subPDU of the random access response message in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located before all type 2 MAC subPDUs.

A substep 202-8 includes: further parsing a third MAC subPDU of the random access response message in case that it is determined that the second MAC subPDU includes an MAC subheader for responding to the Msg1 based system information request.

A substep 202-9 includes: splitting, in case that the third MAC subPDU includes an MAC RAR, a remainder of the entire MAC PDU excluding the first MAC subPDU and the second MAC subPDU according to the preset byte length of the MAC subPDU including an MAC RAR, to obtain each MAC subPDU including an MAC RAR.

A substep 202-10 includes: parsing all the MAC subPDUs in parallel.

Further, after the substep 202-10, the step 202-4 is performed. For details, refer to the description of step 202-4, which is not described herein again.

It should be noted that, the corresponding random access response MAC PDU in the above steps 202-7 to 202-10 includes an MAC subPDU including a BI, an MAC subPDU including an MAC RAR, and an MAC subPDU for responding to an Msg1 based SI request, and the MAC subPDU for responding to the Msg1 based SI request is placed before other MAC subPDUs. The MAC PDU structure and a parsing process performed by UE are as shown in FIG. 14.

Figure 14:
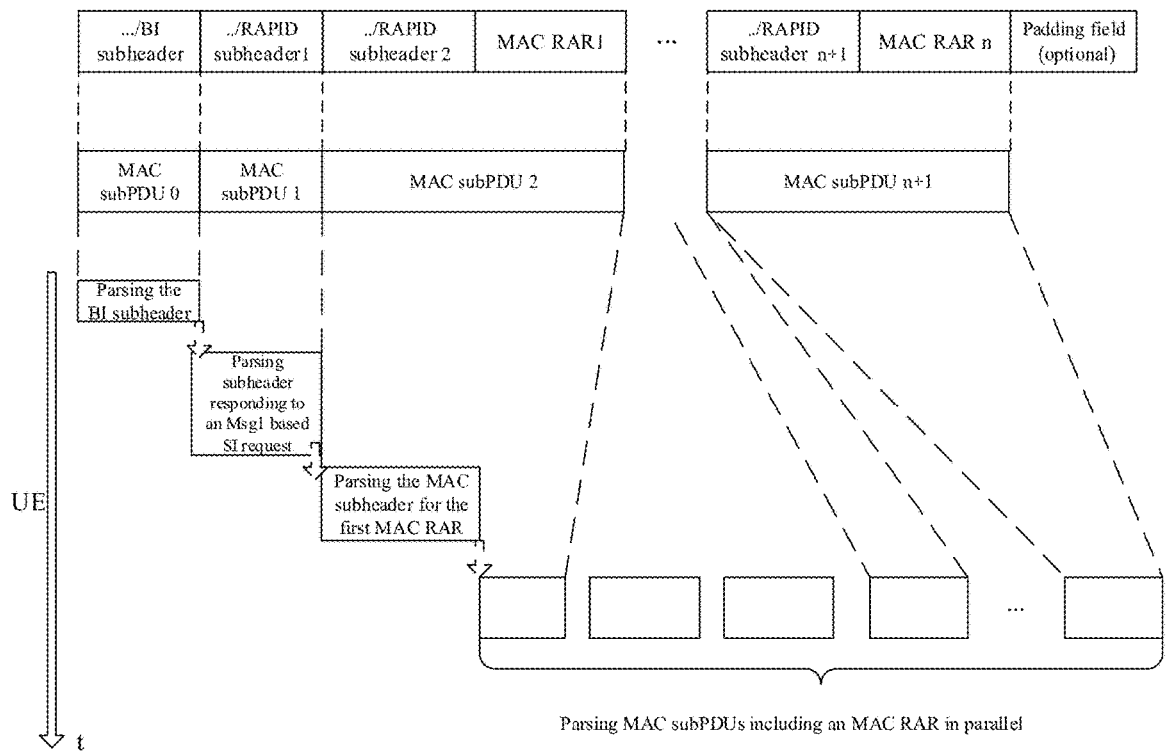
FIG. 14 is a first schematic structural diagram illustrating an MAC PDU, which includes an MAC subPDU including a BI, an MAC subPDU including an MAC RAR, and an MAC subPDU for responding to an Msg1 based SI request, of a random access response message according the present disclosure.

Based on the MAC PDU structure as shown in FIG. 14, in order to more clearly explain the processing process of random access, the following description is given based on both the base station side and the UE side.

1) The Base Station Side

In Step 1, a base station receives a random access request Msg1 transmitted by UE on the same time-frequency resource, and different UE may transmit different preamble codes on the same time-frequency resource.

In Step 2, the base station organizes a random access response Msg2 for UE transmitting the Msg1 on the same time-frequency resource. For UE transmitting different preamble codes on the same time-frequency resource, a plurality of random access responses, that is, MAC RARs, may be organized in one MAC PDU, and at the same time, the base station may transmit a BI to perform a random access congestion control. In case that a preamble reserved by the base station for the Msg1 based SI request is received, the base station responds to the Msg1 based SI request.

In Step 3, the base station receives an Msg3 according to the uplink resource allocated by the Msg2 and performs subsequent operations of random access.

2) The UE Side

Branch 1: in case that the random access process of the Msg1 based SI request can be performed in parallel with other random access processes, the specific steps are as follows.

In Step 1, the UE selects a PRACH and preamble to initiate random access according to a random access resource configured by the base station, where the preamble and/or the PRACH resources reserved by the base station for the system information request are used in case that the UE initiates an Msg1 based SI request.

In Step 2, the UE parses an MAC subheader of the first MAC subPDU and determines that it includes a BI.

In Step 3, the UE parses an MAC subheader of the second MAC subPDU and determines that it includes a response to the Msg1 based SI request.

In case that the UE transmits only a random access request of the Msg1 based SI request, the random access process ends upon the response is received; in case that the UE further transmits other random access requests, the process proceeds to Step 4.

In Step 4, the UE parses MAC subheaders of the subsequent MAC subPDUs and determines that an MAC RAR is included.

In Step 5, the UE splits a remainder of the MAC PDU into an integer number of MAC subPDUs, each MAC subPDU includes an MAC subheader and an MAC RAR, and parses the MAC subPDUs in parallel, and once the MAC subPDU for the UE is acquired, that is, an RAPID included in the MAC subheader of one of the parsed MAC subPDUs is consistent with the preamble ID of the Msg1 transmitted by the UE, other MAC subPDUs are discarded.

In Step 6, the UE transmits an Msg3 and performs subsequent operations according to the received MAC RAR.

Branch 2: in case that the random access process of the Msg1 based SI request cannot be performed in parallel with other random access processes, the specific steps are as follows.

In Step 1, the UE selects a PRACH and preamble to initiate random access according to a random access resource configured by the base station, where the preamble and/or the PRACH resources reserved by the base station for the system information request are used in case that the UE initiates an Msg1 based SI request.

In Step 2, the UE parses an MAC subheader of the first MAC subPDU and determines that it includes a BI.

In Step 3, the UE parses an MAC subheader of the second MAC subPDU and determines that it includes a response to the Msg1 based SI request.

Here, in case that the UE transmits a random access request of the Msg1 based SI request, the random access process ends upon the response is received; in case that the UE transmits a random access process for other purposes, the process proceeds to Step 4.

In Step 4, the UE parses MAC subheaders of the subsequent MAC subPDUs and determines that an MAC RAR is included.

In Step 5, the UE splits the remainder of MAC PDU into an integer number of MAC subPDUs, each MAC subPDU includes an MAC subheader and an MAC RAR, and parses the MAC subPDUs in parallel, and in case that the MAC subPDU for the UE is acquired, that is, an RAPID included in the MAC subheader of one of the parsed MAC subPDUs is consistent with the preamble ID of the Msg1 transmitted by the UE, other MAC subPDUs are discarded.

In Step 6, the UE transmits an Msg3 and performs subsequent operations according to the received MAC RAR.

As another optional implementation, after the substep 202-1, the method further includes following step.

A substep 202-11 includes: splitting, in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located after all type 2 MAC subPDUs, a remainder of the entire MAC PDU excluding the first MAC subPDU according to the preset byte length of the MAC subPDU including an MAC RAR, to obtain each MAC subPDU including an MAC RAR and possibly a remaining part of a size less than the byte length of the MAC subPDU including an MAC RAR, where the remaining part possibly includes the MAC subPDU for responding to the Msg1 based system information request.

Further, after the substep 202-11, the method further includes following step.

A substep 202-12 includes: separately parsing all MAC subPDUs including an MAC RAR in parallel and parsing the MAC subPDU for responding to the Msg1 based system information request if the MAC subPDU for responding to the Msg1 based system information request is included.

Here, after the substep 202-12, the method further includes following step.

A substep 202-13 includes: discarding, by the UE, in case that the UE transmits the Msg1 based system information request and another random access request simultaneously, and in case that the RAPID included in the MAC subheader of one of the parsed MAC subPDUs including an MAC RAR is consistent with a random access preamble ID used by the UE to transmit a random access request Msg1, other MAC subPDUs including an MAC RAR.

A substep 202-14 includes: discarding, by the UE, in case that the UE transmits only the Msg1 based system information request, all MAC subPDUs including an MAC RAR, and parsing only the remaining part to obtain a response to the Msg1 based system information request.

A substep 202-15 includes: discarding, by the UE, in case that the UE only transmits a random access request other than the Msg1 based system information request, the remaining part possibly including the MAC subPDU for responding to the Msg1 based system information request, and parsing MAC subPDUs including an MAC RAR in parallel, and discarding, in case that the RAPID included in the MAC subheader of one of the parsed MAC subPDUs is consistent with a random access preamble ID used by the UE to transmit a random access request Msg1, all other MAC subPDUs.

It should be noted that, the corresponding random access response MAC PDU in the above substeps 201-12 to 201-15 includes an MAC subPDU including a BI, an MAC subPDU including an MAC RAR, and an MAC subPDU for responding to an Msg1 based SI request, and the MAC subPDU for responding to the Msg1 based SI request is placed after other MAC subPDUs. The MAC PDU structure and a parsing process performed by the UE are as shown in FIG. 15.

Figure 15:
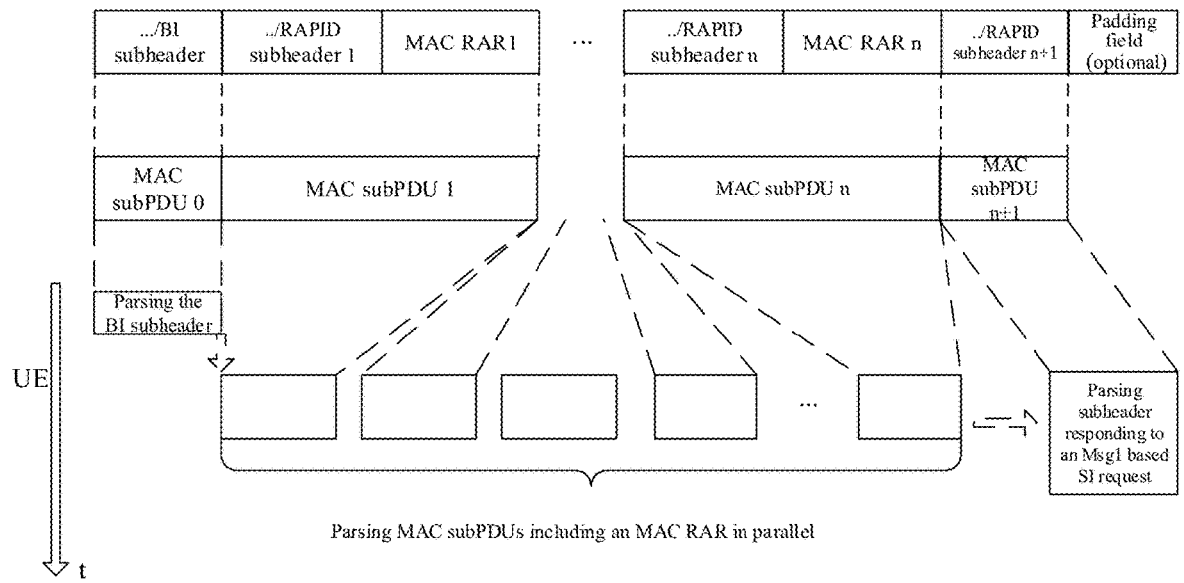
FIG. 15 is a second schematic structural diagram illustrating an MAC PDU, which includes an MAC subPDU including a BI, an MAC subPDU including an MAC RAR, and an MAC subPDU for responding to an Msg1 based SI request, of a random access response message according the present disclosure.

Based on the MAC PDU structure as shown in FIG. 15, in order to more clearly explain the processing process of random access, the following description is given based on both the base station side and the UE side.

1) The Base Station Side

In Step 1, a base station receives a random access request Msg1 transmitted by UE on the same time-frequency resource, and different UE may transmit different preamble codes on the same time-frequency resource.

In Step 2, the base station organizes a random access response Msg2 for UE transmitting the Msg1 on the same time-frequency resource. For UE transmitting different preamble codes on the same time-frequency resource, a plurality of random access responses, that is, MAC RARs, can be organized in one MAC PDU, and at the same time, the base station may transmit a BI to perform a random access congestion control. In case that a preamble reserved by the base station for the Msg1 based SI request is received, the base station responds to the Msg1 based SI request.

In Step 3, the base station receives an Msg3 according to the uplink resource allocated by the Msg2 and performs subsequent operations of random access.

2) The UE Side

Branch 1: in case that the random access process of the Msg1 based SI request can be performed in parallel with other random access processes, the specific steps are as follows.

In Step 1, the UE selects a PRACH and preamble to initiate random access according to a random access resource configured by the base station, where the preamble and/or the PRACH resources reserved by the base station for the system information request are used in case that the UE initiates a process of an Msg1 based SI request.

In Step 2: the UE parses an MAC subheader of the first MAC subPDU and determines that it includes a BI.

In Step 3, the UE splits the remainder of MAC PDU into an integer number of MAC subPDUs including an MAC RAR, and parses the MAC subPDUs in parallel, and in case that the MAC subPDU for the UE is acquired, that is, an RAPID included in the MAC subheader of one of the parsed MAC subPDUs is consistent with the preamble ID of the Msg1 transmitted by the UE, other MAC subPDUs including an MAC RAR are discarded; at the same time, in case that the UE transmits an Msg1 based SI request, the split remaining part is parsed in parallel to obtain a response to the Msg1 based SI request, and a size of the split remaining part is less than the size of an MAC subPDU including an MAC RAR.

In Step 4, the UE transmits an Msg3 and performs subsequent operations according to the received MAC RAR.

Branch 2: in case that the random access process of the Msg1 based SI request cannot be performed in parallel with other random access processes, the specific steps are as follows.

In Step 1, the UE selects a PRACH and preamble to initiate random access according to a random access resource configured by the base station, where the preamble and/or the PRACH resources reserved by the base station for the system information request are used in case that the UE initiates a process of an Msg1 based SI request.

In Step 2, the UE parses an MAC subheader of the first MAC subPDU and determines that it includes a BI.

In Step 3, in case that the random access request transmitted by the UE is a random access request other than the Msg1 based SI request, the UE splits the remainder of MAC PDU into an integer number of MAC subPDUs including an MAC RAR, and parses the MAC subPDUs in parallel, and discards, in case that the MAC subPDU for the UE is acquired, that is, an RAPID included in the MAC subheader of one of the parsed MAC subPDUs is consistent with the preamble ID of the Msg1 transmitted by the UE, other MAC subPDUs including an MAC RAR, and at the same time, discards the split remaining part.

In case that the random access request transmitted by the UE is a random access request of the Msg1 based SI request, the UE splits the remainder of MAC PDU into an integer number of MAC subPDUs including an MAC RAR and discards them. The UE only parses the split remaining part, and acquires a response to the Msg1 based SI request. The size of the split remaining part is less than the size of the MAC subPDU including an MAC RAR.

In Step 4, the UE transmits an Msg3 and performs subsequent operations according to the received MAC RAR.

According to the random access response method of some embodiments of the present disclosure, the UE receives the random access response message transmitted by the base station and parses the random access response message, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU, so that single UE can quickly receive and parse a response to a random access request transmitted by the UE, which reduces random access latency, and realizes the power saving of the UE.

Figure 16:
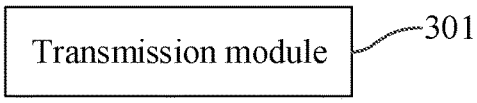
FIG. 16 is a first schematic module diagram of a random access response device according to some embodiments of the present disclosure.

As shown in FIG. 16, some embodiments of the present disclosure further provide a random access response device, including: a transmission module 301 configured to transmit a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In the random access response device of some embodiments of the present disclosure, the MAC subPDU includes a type 1 MAC subPDU, the type 1 MAC subPDU includes only a first MAC subheader.

Optionally, in the random access response device of some embodiments of the present disclosure, the first MAC subheader is a subheader including a back off indicator (BI).

Specifically, in the random access response message, the type 1 MAC subPDU is arranged before other MAC subPDUs.

Optionally, in the random access response device of some embodiments of the present disclosure, the first MAC subheader is an MAC subheader for responding to an Msg1 based system information request.

Specifically, the type 1 MAC subPDU is located at a predetermined position of the MAC PDU of the random access response message.

Specifically, the predetermined position is a position before all type 2 MAC subPDUs, or a position after all the type 2 MAC subPDUs, where the type 2 MAC subPDU includes an MAC subheader and a corresponding MAC RAR.

According to the random access response device of some embodiments of the present disclosure, a base station transmits a random access response message to the UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU, so as to enable the base station gNB to quickly respond to random access requests originating from a plurality of UE and a variety of demands.

It should be noted that this device is a device corresponding to the foregoing method embodiment, and all implementations of the foregoing method embodiment are applicable to the device embodiment, and may also achieve the same technical effect.

Figure 17:
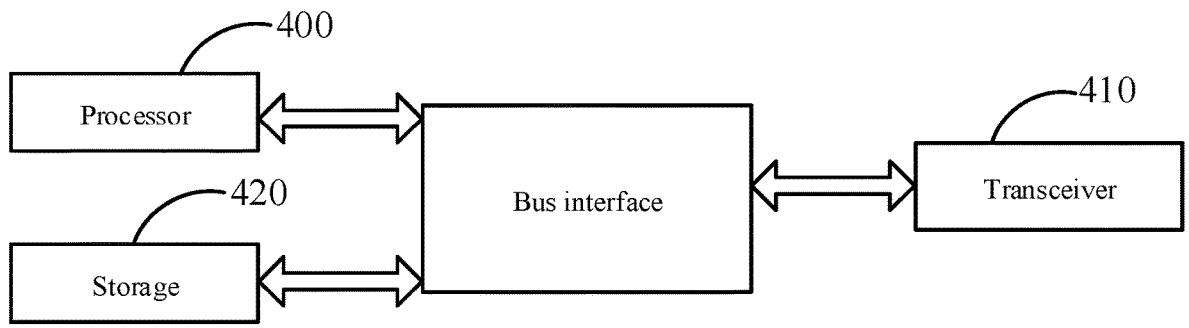
FIG. 17 is a block diagram illustrating a structure of a base station according to some embodiments of the present disclosure.

As shown in FIG. 17, some embodiments of the present disclosure further provide a base station, which includes a storage 420, a processor 400, a transceiver 410, a bus interface, and a computer program stored in the storage 420 and executable by the processor 400. The processor 400 is configured to read the program in the storage 420 and execute the following processes: transmitting a random access response message to UE, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In FIG. 17, a bus architecture may include any number of interconnected buses and bridges. Various circuits, specifically, one or more processors represented by the processor 400 and a storage represented by the storage 420, are linked together. The bus architecture may also link various other circuits such as peripherals, voltage regulators and power management circuits, which are well known in the art, and therefore a further description is omitted herein. The bus interface provides interfaces. The transceiver 410 may be a plurality of elements, that is, includes a transmitter and a transceiver, to provide units configured to communicate with various other apparatuses over a transmission medium. The processor 400 is responsible for managing the bus architecture and general processing, and the storage 420 may store data used by the processor 400 when performing operations.

Optionally, the MAC subPDU includes a type 1 MAC subPDU, the type 1 MAC subPDU includes only a first MAC subheader.

Optionally, the first MAC subheader is a subheader including a back off indicator (BI).

Optionally, in the random access response message, the type 1 MAC subPDU is arranged before other MAC subPDUs.

Optionally, the first MAC subheader is an MAC subheader for responding to an Msg1 based system information request.

Optionally, the type 1 MAC subPDU is located at a predetermined position of the MAC PDU of the random access response message.

Optionally, the predetermined position is a position before all type 2 MAC subPDUs, or a position after all the type 2 MAC subPDUs, where the type 2 MAC subPDU includes an MAC subheader and a corresponding MAC RAR.

The program, when executed by the processor, may achieve all implementations of the foregoing method embodiments. To avoid redundancy, a repeated description is omitted herein.

Figure 18:
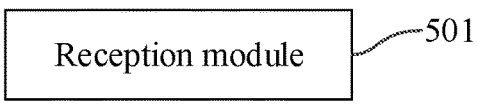
FIG. 18 is a second schematic module diagram of a random access response device according to some embodiments of the present disclosure.

As shown in FIG. 18, some embodiments of the present disclosure further provide a random access response device, including: a reception module 501 configured to receive a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In the random access response device of some embodiments of the present disclosure, the MAC subPDU includes a type 1 MAC subPDU, the type 1 MAC subPDU includes only a first MAC subheader.

Optionally, in the random access response device of some embodiments of the present disclosure, the first MAC subheader is a subheader including a back off indicator (BI).

Optionally, in the random access response device of some embodiments of the present disclosure, in the random access response message, the type 1 MAC subPDU is arranged before other MAC subPDUs.

Optionally, the first MAC subheader is an MAC subheader for responding to an Msg1 based system information request.

Specifically, in the random access response device of some embodiments of the present disclosure, the type 1 MAC subPDU is located at a predetermined position of the MAC PDU of the random access response message.

Specifically, the predetermined position is a position before all type 2 MAC subPDUs, or a position after all the type 2 MAC subPDUs, where the type 2 MAC subPDU includes an MAC subheader and a corresponding MAC RAR.

In the random access response device of some embodiments of the present disclosure, the random access response device includes: a parsing module 502 configured to parse the random access response message after the random access response message transmitted by the base station is received.

In the random access response device of some embodiments of the present disclosure, the parsing module 502 includes: a first parsing submodule 502-1 configured to parse a first MAC subPDU of the random access response message; a first splitting submodule 502-2 configured to split, in case that an MAC subheader of the first MAC subPDU includes a random access preamble ID (RAPID) and therefore the first MAC subPDU is an MAC subPDU including an MAC RAR, the entire MAC PDU according to a preset byte length of an MAC subPDU including an MAC RAR to obtain each MAC subPDU including an MAC RAR; and a first parallel parsing submodule 502-3 configured to parse all the MAC subPDUs in parallel.

In the random access response device of some embodiments of the present disclosure, the parsing module 502 includes: a second splitting submodule 502-4, configured to, after the first MAC subPDU of the random access response message is parsed, split, in case that the first MAC subPDU is an MAC subheader including a back off indicator (BI) and an Msg1 based system information request function is not enabled for a cell where the UE initiates random access, a remainder of the entire MAC PDU excluding the first MAC subPDU according to the preset byte length of the MAC subPDU including an MAC RAR, to obtain each MAC subPDU including an MAC RAR; a second parallel parsing submodule 502-5, configured to parse all the MAC subPDUs in parallel.

In the random access response device of some embodiments of the present disclosure, the parsing module 502 includes: a second parsing submodule 502-6, configured to, after the first MAC subPDU of the random access response message is parsed, further parse a second MAC subPDU of the random access response message in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located before all type 2 MAC subPDUs; a third parsing submodule, configured to further parse a third MAC subPDU of the random access response message in case that it is determined that the second MAC subPDU includes an MAC subheader for responding to the Msg1 based system information request; a third parsing submodule 502-7, configured to further parse the third MAC subPDU of the random access response message in case that it is determined that the second MAC subPDU includes an MAC subheader for responding to the Msg1 based system information request; a third splitting submodule 502-8, configured to split, in case that the third MAC subPDU includes an MAC RAR, a remainder of the entire MAC PDU excluding the first MAC subPDU and the second MAC subPDU according to the preset byte length of the MAC subPDU including an MAC RAR, to obtain each MAC subPDU including an MAC RAR; a third parallel parsing submodule 502-9, configured to parse all the MAC subPDUs in parallel.

In the random access response device of some embodiments of the present disclosure, the parsing module 502 includes: a first processing submodule 502-10, configured to, after all the MAC subPDUs are parsed in parallel, discard, when the RAPID included in the MAC subheader of one of the parsed MAC subPDUs is consistent with a random access preamble ID used by the UE to transmit a random access request Msg1, other MAC subPDUs including an MAC RAR.

In the random access response device of some embodiments of the present disclosure, the parsing module 502 includes: a fourth splitting submodule 502-11, configured to, after the first MAC subPDU of the random access response message is parsed, split, in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located after all type 2 MAC subPDUs, a remainder of the entire MAC PDU excluding the first MAC subPDU according to the preset byte length of the MAC subPDU including an MAC RAR, to obtain each MAC subPDU including an MAC RAR and possibly a remaining part of a size less than the byte length of the MAC subPDU including an MAC RAR, where the remaining part possibly includes the MAC subPDU for responding to the Msg1 based system information request.

In the random access response device of some embodiments of the present disclosure, the parsing module 502 includes: a fourth parsing submodule 502-12, configured to separately parse all the MAC subPDUs including an MAC RAR in parallel and parse the MAC subPDU for responding to the Msg1 based system information request if the MAC subPDU for responding to the Msg1 based system information request is included.

In the random access response device of some embodiments of the present disclosure, the parsing module 502 includes: a second processing submodule 502-13, configured to discard, in case that the UE transmits the Msg1 based system information request and another random access request simultaneously, and in case that the RAPID included in the MAC subheader of one of the parsed MAC subPDUs including an MAC RAR is consistent with a random access preamble ID used by the UE to transmit a random access request Msg1, other MAC subPDUs including an MAC RAR; a third processing submodule 502-14, configured to discard, by the UE, in case that the UE transmits only the Msg1 based system information request, all MAC subPDUs including an MAC RAR, and parse only the remaining part to obtain a response to the Msg1 based system information request; a fourth processing submodule 502-15, configured to discard, by the UE, in case that the UE only transmits a random access request other than the Msg1 based system information request, the remaining part possibly including the MAC subPDU for responding to the Msg1 based system information request, and parse MAC subPDUs including an MAC RAR in parallel, and discard, in case that the RAPID included in the MAC subheader of one of the parsed MAC subPDUs is consistent with a random access preamble ID used by the UE to transmit a random access request Msg1, all other MAC subPDUs.

According to the random access response device of some embodiments of the present disclosure, the UE receives the random access response message transmitted by the base station and parses the random access response message, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU, so that single UE can quickly receive and parse a response to a random access request transmitted by the UE, which reduces random access latency, and realizes the power saving of the UE.

It should be noted that the random access response device is a device corresponding to the above random access response method, and all implementations of the foregoing method embodiment are applicable to the device embodiment, and may also achieve the same technical effect.

Figure 19:
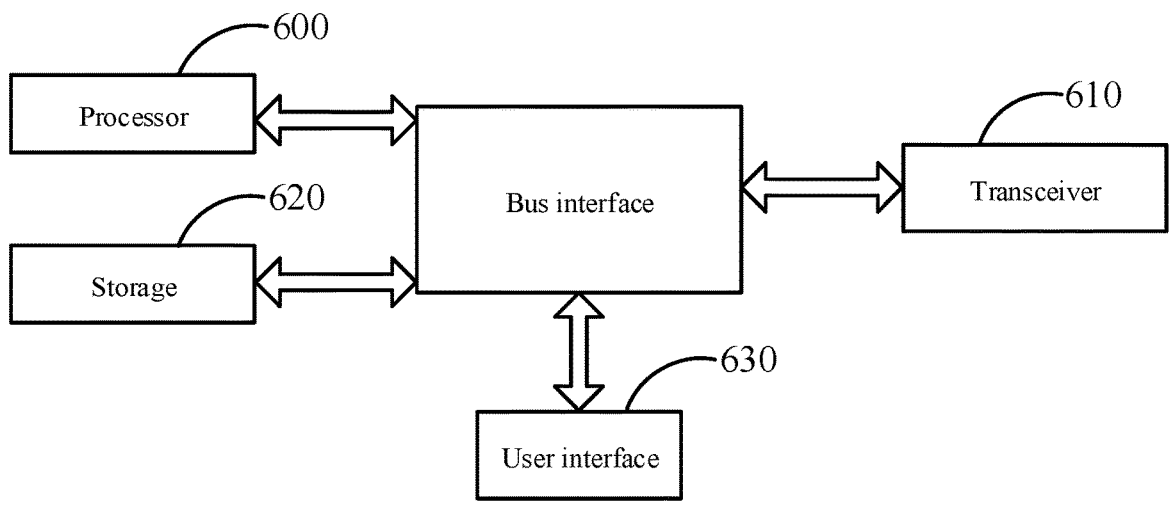
FIG. 19 is a block diagram illustrating a structure of UE according to some embodiments of the present disclosure.

As shown in FIG. 19, some embodiments of the present disclosure further provide UE, which includes a storage 620, a processor 600, a transceiver 610, a user interface 630, a bus interface, and a computer program stored in the storage 620 and executable by the processor 600. The processor 600 is configured to read the program in the storage 620 and execute the following processes: receiving a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

In FIG. 19, a bus architecture may include any number of interconnected buses and bridges. Various circuits, specifically, one or more processors represented by the processor 600 and a storage represented by the storage 620, are linked together. The bus architecture can also link various other circuits such as peripherals, voltage regulators and power management circuits, which are well known in the art, and therefore a further description is omitted herein. The bus interface provides interfaces. The transceiver 610 may be a plurality of elements, that is, includes a transmitter and a transceiver, to provide units configured to communicate with various other apparatuses over a transmission medium. For different user equipment, the user interface 630 may also be an interface capable of externally/internally connecting the required devices which including, but not limited to, a keypad, a display, a speaker, a microphone, a joystick, and the like.

The processor 600 is responsible for managing the bus architecture and general processing, and the storage 620 may store data used by the processor 600 when performing operations.

Optionally, the MAC subPDU includes a type 1 MAC subPDU, the type 1 MAC subPDU includes only a first MAC subheader.

Optionally, the first MAC subheader is a subheader including a back off indicator (BI).

Optionally, in the random access response message, the type 1 MAC subPDU is arranged before other MAC subPDUs.

Optionally, the first MAC subheader is an MAC subheader for responding to an Msg1 based system information request.

Optionally, the type 1 MAC subPDU is located at a predetermined position of the MAC PDU of the random access response message.

Optionally, the predetermined position is a position before all type 2 MAC subPDUs, or a position after all the type 2 MAC subPDUs, where the type 2 MAC subPDU includes an MAC subheader and a corresponding MAC RAR.

The processor 600 is further configured to read the program in the storage 620 and execute the following step: parsing the random access response message.

The processor 600 is further configured to read the program in the storage 620 and execute the following steps: parsing a first MAC subPDU of the random access response message; splitting, in case that an MAC subheader of the first MAC subPDU includes a random access preamble ID (RAPID) and therefore the first MAC subPDU is an MAC subPDU including an MAC RAR, the entire MAC PDU according to a preset byte length of an MAC subPDU including an MAC RAR to obtain each MAC subPDU including an MAC RAR; parsing all the MAC subPDUs in parallel.

The processor 600 is further configured to read the program in the storage 620 and execute the following steps: splitting, in case that the first MAC subPDU is an MAC subheader including a back off indicator (BI) and an Msg1 based system information request function is not enabled for a cell where the UE initiates random access, a remainder of the entire MAC PDU excluding the first MAC subPDU according to the preset byte length of the MAC subPDU including an MAC RAR, to obtain each MAC subPDU including an MAC RAR; parsing all the MAC subPDUs in parallel.

The processor 600 is further configured to read the program in the storage 620 and execute the following steps: further parsing a second MAC subPDU of the random access response message in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located before all type 2 MAC subPDUs; further parsing a third MAC subPDU of the random access response message in case that it is determined that the second MAC subPDU includes an MAC subheader for responding to the Msg1 based system information request; splitting, in case that the third MAC subPDU includes an MAC RAR, a remainder of the entire MAC PDU excluding the first MAC subPDU and the second MAC subPDU according to the preset byte length of the MAC subPDU including an MAC RAR, to obtain each MAC subPDU including an MAC RAR; parsing all the MAC subPDUs in parallel.

The processor 600 is further configured to read the program in the storage 620 and execute the following step: discarding, when the RAPID included in the MAC subheader of one of the parsed MAC subPDUs is consistent with a random access preamble ID used by the UE to transmit a random access request Msg1, other MAC subPDUs including an MAC RAR.

The processor 600 is further configured to read the program in the storage 620 and execute the following step: splitting, in case that the first MAC subPDU is an MAC subheader including a back off indicator (BI) and an Msg1 based system information request function is enabled for a cell where the UE initiates random access and it is predetermined that the MAC subPDU for responding to the Msg1 based system information request is located after all type 2 MAC subPDUs, a remainder of the entire MAC PDU excluding the first MAC subPDU according to the preset byte length of the MAC subPDU including an MAC RAR, to obtain each MAC subPDU including an MAC RAR, and possibly a remaining part of a size less than the byte length of the MAC subPDU including an MAC RAR, where the remaining part possibly includes the MAC subPDU for responding to the Msg1 based system information request.

The processor 600 is further configured to read the program in the storage 620 and execute the following step: separately parsing all the MAC subPDUs including an MAC RAR in parallel and parsing the MAC subPDU for responding to the Msg1 based system information request if the MAC subPDU for responding to the Msg1 based system information request is included.

The processor 600 is further configured to read the program in the storage 620 and execute the following steps: discarding, by the UE, in case that the UE transmits the Msg1 based system information request and another random access request simultaneously, and in case that the RAPID included in the MAC subheader of one of the parsed MAC subPDUs including an MAC RAR is consistent with a random access preamble ID used by the UE to transmit a random access request Msg1, other MAC subPDUs including an MAC RAR; discarding, by the UE, in case that the UE transmits only the Msg1 based system information request, all MAC subPDUs including an MAC RAR, and parsing only the remaining part to obtain a response to the Msg1 based system information request; discarding, by the UE, in case that the UE only transmits a random access request other than the Msg1 based system information request, the remaining part possibly including the MAC subPDU for responding to the Msg1 based system information request, and parsing MAC subPDUs including an MAC RAR in parallel, and discarding, in case that the RAPID included in the MAC subheader of one of the parsed MAC subPDUs is consistent with a random access preamble ID used by the UE to transmit a random access request Msg1, all other MAC subPDUs.

In some embodiments of the present disclosure, a computer readable storage medium is further provided, a computer program is stored therein, where the program is configured to be executed by a processor to implement following steps: receiving a random access response message transmitted by a base station, where a medium access control protocol data unit (MAC PDU) of the random access response message includes at least one medium access control sub-protocol data unit (MAC subPDU), each MAC subPDU includes an MAC subheader and possibly a medium access control random access response (MAC RAR) corresponding to the MAC subheader; in case that there are at least two MAC subPDUs, the at least two MAC subPDUs are sequentially arranged in the MAC PDU.

The program, when executed by the processor, may achieve all implementations of the foregoing method embodiments. To avoid redundancy, a repeated description is omitted herein.

In various embodiments of the present disclosure, the computer readable storage medium may be a volatile storage medium or a non-volatile storage medium. It should be understood that the numbering of various processes is not intended to imply an execution sequence. The execution sequence of the processes should be determined in accordance with the functions and inherent logic thereof, and by no means constitutes any limitation as to the implementation of the embodiments of the present disclosure.

A person skilled in the art may be aware that, the exemplary modules, submodules, units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

Optional embodiments of the disclosure are described above. It should be noted that modifications and replacements may be made in the embodiments by a person of ordinary skill in the art without departing from the principle of the present disclosure, and these modifications and replacements shall fall within the scope of the present disclosure.

What is claimed is:

1. A random access response method, applied to a base station, comprising:

transmitting a random access response message to user equipment (UE), wherein a medium access control protocol data unit (MAC PDU) of the random access response message comprises a medium access control sub-protocol data unit (MAC subPDU), the MAC subPDU comprises an MAC subheader and a medium access control random access response (MAC RAR) corresponding to and immediately following the MAC subheader or comprises only an MAC subheader;

wherein the MAC subPDU comprising only the MAC subheader is an MAC subPDU comprising only an MAC subheader for responding to an Msg1 based system information request or is an MAC subPDU comprising only an MAC subheader comprising a back off indicator (BI);

wherein, in case that the MAC PDU comprises at least two MAC subPDUs, the at least two MAC subPDUs are sequentially arranged in the MAC PDU;

the MAC subPDU comprising only the MAC subheader comprising the BI is arranged before other MAC subPDUs, the MAC subPDU comprising only the MAC subheader for responding to the Msg1 based system information request is located at a predetermined position of the MAC PDU of the random access response message.

2. The random access response method according to claim 1, wherein the predetermined position is a position before all type 2 MAC subPDUs, or a position after all the type 2 MAC subPDUs, wherein the type 2 MAC subPDU comprises an MAC subheader and a corresponding MAC RAR.

3. A base station, comprising:

a storage, a processor and a computer program stored in the storage and configured to be executed by the processor, wherein, the processor is configured to execute the computer program, to implement the method according to claim 1.

4. The base station according to claim 3, wherein the predetermined position is a position before all type 2 MAC subPDUs, or a position after all the type 2 MAC subPDUs, wherein the type 2 MAC subPDU comprises an MAC subheader and a corresponding MAC RAR.

5. A non-transitory computer readable storage medium storing therein a computer program, wherein the computer program is configured to be executed by a processor to implement the method according to claim 1.

6. A random access response method, applied to user equipment (UE), comprising:

receiving a random access response message transmitted by a base station, wherein a medium access control protocol data unit (MAC PDU) of the random access response message comprises a medium access control sub-protocol data unit (MAC subPDU), the MAC subPDU comprises an MAC subheader and a medium access control random access response (MAC RAR) corresponding to and immediately following the MAC subheader or comprises only an MAC subheader;

wherein the MAC subPDU comprising only the MAC subheader is an MAC subPDU comprising only an MAC subheader for responding to an Msg1 based system information request or is an MAC subPDU comprising only an MAC subheader comprising a back off indicator (BI);

wherein, in case that the MAC PDU comprises at least two MAC subPDUs, the at least two MAC subPDUs are sequentially arranged in the MAC PDU;

the MAC subPDU comprising only the MAC subheader comprising the BI is arranged before other MAC subPDUs, the MAC subPDU comprising only the MAC subheader for responding to the Msg1 based system information request is located at a predetermined position of the MAC PDU of the random access response message.

7. The random access response method according to claim 6, wherein the predetermined position is a position before all type 2 MAC subPDUs, or a position after all the type 2 MAC subPDUs, wherein the type 2 MAC subPDU comprises an MAC subheader and a corresponding MAC RAR.

8. The random access response method according to claim 6, wherein, after the receiving the random access response message transmitted by the base station, the method further comprises:

parsing the random access response message.

9. The random access response method according to claim 8, wherein the parsing the random access response message comprises:

parsing a first MAC subPDU of the random access response message;

splitting, in case that an MAC subheader of the first MAC subPDU comprises a random access preamble ID (RAPID) and therefore the first MAC subPDU is an MAC subPDU comprising an MAC RAR, the entire MAC PDU according to a preset byte length of an MAC subPDU comprising an MAC RAR to obtain each MAC subPDU comprising an MAC RAR;

parsing all the MAC subPDUs in parallel.

10. The random access response method according to claim 9, wherein, after the parsing the first MAC subPDU of the random access response message, the method further comprises:

splitting, in case that the first MAC subPDU is an MAC subheader comprising a back off indicator (BI) and an Msg1 based system information request function is not enabled for a cell where the UE initiates random access, a remainder of the entire MAC PDU excluding the first MAC subPDU according to the preset byte length of the MAC subPDU comprising the MAC RAR, to obtain each MAC subPDU comprising an MAC RAR;

parsing all the MAC subPDUs in parallel;

or, after the parsing the first MAC subPDU of the random access response message, the method further comprises:

further parsing a second MAC subPDU of the random access response message in case that the first MAC subPDU is an MAC subheader comprising a back off indicator (BI) and an Msg1 based system information request function is enabled for a cell where the UE initiates random access and it is predetermined that an MAC subPDU for responding to the Msg1 based system information request is located before all type 2 MAC subPDUs;

further parsing a third MAC subPDU of the random access response message in case that it is determined that the second MAC subPDU comprises an MAC subheader for responding to the Msg1 based system information request;

splitting, in case that the third MAC subPDU comprises an MAC RAR, a remainder of the entire MAC PDU excluding the first MAC subPDU and the second MAC subPDU according to the preset byte length of the MAC subPDU comprising the MAC RAR, to obtain each MAC subPDU comprising an MAC RAR;

parsing all the MAC subPDUs in parallel;

or, after the parsing all the MAC subPDUs in parallel, the method further comprises:

discarding, when the RAPID comprised in the MAC subheader of one of the parsed MAC subPDUs is consistent with a random access preamble ID used by the UE to transmit a random access request Msg1, other MAC subPDUs comprising an MAC RAR;

or, after the parsing the first MAC subPDU of the random access response message, the method further comprises:

splitting, in case that the first MAC subPDU is an MAC subheader comprising a back off indicator (BI) and an Msg1 based system information request function is enabled for a cell where the UE initiates random access and it is predetermined that an MAC subPDU for responding to the Msg1 based system information request is located after all type 2 MAC subPDUs, a remainder of the entire MAC PDU excluding the first MAC subPDU according to the preset byte length of the MAC subPDU comprising the MAC RAR, to obtain each MAC subPDU comprising an MAC RAR, or to obtain each MAC subPDU comprising an MAC RAR and a remaining part of a size less than the byte length of the MAC subPDU comprising the MAC RAR, wherein the remaining part comprises or does not comprise the MAC subPDU for responding to the Msg1 based system information request.

11. The random access response method according to claim 10, wherein, in case that the first MAC subPDU is an MAC subheader comprising a back off indicator (BI) and an Msg1 based system information request function is enabled for a cell where the UE initiates random access and it is predetermined that an MAC subPDU for responding to the Msg1 based system information request is located after all type 2 MAC subPDUs, after the obtaining each MAC subPDU comprising the MAC RAR, the method further comprises:

separately parsing all the MAC subPDUs comprising an MAC RAR in parallel and parsing the MAC subPDU for responding to the Msg1 based system information request if the MAC subPDU for responding to the Msg1 based system information request is comprised.

12. The random access response method according to claim 11, further comprising:

discarding, by the UE, in case that the UE transmits the Msg1 based system information request and another random access request simultaneously, and in case that the RAPID comprised in the MAC subheader of one of the parsed MAC subPDUs comprising an MAC RAR is consistent with a random access preamble ID used by the UE to transmit a random access request Msg1, other MAC subPDUs comprising an MAC RAR;

discarding, by the UE, in case that the UE transmits only the Msg1 based system information request, all MAC subPDUs comprising an MAC RAR, and parsing only the remaining part to obtain a response to the Msg1 based system information request;

discarding, by the UE, in case that the UE only transmits a random access request other than the Msg1 based system information request, the remaining part comprising or not comprising the MAC subPDU for responding to the Msg1 based system information request, and parsing MAC subPDUs comprising an MAC RAR in parallel, and discarding, in case that the RAPID comprised in the MAC subheader of one of the parsed MAC subPDUs is consistent with a random access preamble ID used by the UE to transmit a random access request Msg1, all other MAC subPDUs.

13. User equipment (UE), comprising:

a storage, a processor and a computer program stored in the storage and configured to be executed by the processor, wherein, the processor is configured to execute the computer program, to implement steps of the method according to claim 6.

14. The UE according to claim 13, wherein the predetermined position is a position before all type 2 MAC subPDUs, or a position after all the type 2 MAC subPDUs, wherein the type 2 MAC subPDU comprises an MAC subheader and a corresponding MAC RAR.

15. The UE according to claim 13, wherein, after the receiving the random access response message transmitted by the base station, the processor is further configured to execute the computer program, to implement following step:

parsing the random access response message.

16. The UE according to claim 15, wherein the processor is further configured to execute the computer program, to implement following steps:

parsing a first MAC subPDU of the random access response message;

splitting, in case that an MAC subheader of the first MAC subPDU comprises a random access preamble ID (RAPID) and therefore the first MAC subPDU is an MAC subPDU comprising an MAC RAR, the entire MAC PDU according to a preset byte length of an MAC subPDU comprising an MAC RAR to obtain each MAC subPDU comprising an MAC RAR;

parsing all the MAC subPDUs in parallel.

17. The UE according to claim 16, wherein, after the parsing the first MAC subPDU of the random access response message, the processor is further configured to execute the computer program, to implement following steps:

splitting, in case that the first MAC subPDU is an MAC subheader comprising a back off indicator (BI) and an Msg1 based system information request function is not enabled for a cell where the UE initiates random access, a remainder of the entire MAC PDU excluding the first MAC subPDU according to the preset byte length of the MAC subPDU comprising the MAC RAR, to obtain each MAC subPDU comprising an MAC RAR;

parsing all the MAC subPDUs in parallel;

or, after the parsing the first MAC subPDU of the random access response message, the processor is further configured to execute the computer program, to implement following steps:

further parsing a second MAC subPDU of the random access response message in case that the first MAC subPDU is an MAC subheader comprising a back off indicator (BI) and an Msg1 based system information request function is enabled for a cell where the UE initiates random access and it is predetermined that an MAC subPDU for responding to the Msg1 based system information request is located before all type 2 MAC subPDUs;

further parsing a third MAC subPDU of the random access response message in case that it is determined that the second MAC subPDU comprises an MAC subheader for responding to the Msg1 based system information request;

splitting, in case that the third MAC subPDU comprises an MAC RAR, a remainder of the entire MAC PDU excluding the first MAC subPDU and the second MAC subPDU according to the preset byte length of the MAC subPDU comprising the MAC RAR, to obtain each MAC subPDU comprising an MAC RAR;

parsing all the MAC subPDUs in parallel;

or, after the parsing all the MAC subPDUs in parallel, the processor is further configured to execute the computer program, to implement following step:

discarding, when the RAPID comprised in the MAC subheader of one of the parsed MAC subPDUs is consistent with a random access preamble ID used by the UE to transmit a random access request Msg1, other MAC subPDUs comprising an MAC RAR;

or, after the parsing the first MAC subPDU of the random access response message, the processor is further configured to execute the computer program, to implement following step:

splitting, in case that the first MAC subPDU is an MAC subheader comprising a back off indicator (BI) and an Msg1 based system information request function is enabled for a cell where the UE initiates random access and it is predetermined that an MAC subPDU for responding to the Msg1 based system information request is located after all type 2 MAC subPDUs, a remainder of the entire MAC PDU excluding the first MAC subPDU according to the preset byte length of the MAC subPDU comprising the MAC RAR, to obtain each MAC subPDU comprising an MAC RAR, or to obtain each MAC subPDU comprising an MAC RAR and a remaining part of a size less than the byte length of the MAC subPDU comprising the MAC RAR, wherein the remaining part comprises or does not comprise the MAC subPDU for responding to the Msg1 based system information request.

18. The UE according to claim 17, wherein, in case that the first MAC subPDU is an MAC subheader comprising a back off indicator (BI) and an Msg1 based system information request function is enabled for a cell where the UE initiates random access and it is predetermined that an MAC subPDU for responding to the Msg1 based system information request is located after all type 2 MAC subPDUs, after the obtaining each MAC subPDU comprising the MAC RAR, the processor is further configured to execute the computer program, to implement following steps:

separately parsing all the MAC subPDUs comprising an MAC RAR in parallel and parsing the MAC subPDU for responding to the Msg1 based system information request if the MAC subPDU for responding to the Msg1 based system information request is comprised.

19. The UE according to claim 18, wherein the processor is further configured to execute the computer program, to implement following steps:

discarding, by the UE, in case that the UE transmits the Msg1 based system information request and another random access request simultaneously, and in case that the RAPID comprised in the MAC subheader of one of the parsed MAC subPDUs comprising an MAC RAR is consistent with a random access preamble ID used by the UE to transmit a random access request Msg1, other MAC subPDUs comprising an MAC RAR;

discarding, by the UE, in case that the UE transmits only the Msg1 based system information request, all MAC subPDUs comprising an MAC RAR, and parsing only the remaining part to obtain a response to the Msg1 based system information request;

discarding, by the UE, in case that the UE only transmits a random access request other than the Msg1 based system information request, the remaining part comprising or not comprising the MAC subPDU for responding to the Msg1 based system information request, and parsing MAC subPDUs comprising an MAC RAR in parallel, and discarding, in case that the RAPID comprised in the MAC subheader of one of the parsed MAC subPDUs is consistent with a random access preamble ID used by the UE to transmit a random access request Msg1, all other MAC subPDUs.

20. A non-transitory computer readable storage medium storing therein a computer program, wherein the computer program is configured to be executed by a processor to implement steps of the method according to claim 6.

* * * * *